(12) United States Patent
Isumi et al.

(10) Patent No.: US 7,610,168 B2
(45) Date of Patent: Oct. 27, 2009

(54) PASS/FAIL JUDGMENT DEVICE, PASS/FAIL JUDGMENT PROGRAM, PASS/FAIL JUDGMENT METHOD, AND MULTIVARIATE STATISTICS ANALYZER

(75) Inventors: Yasuo Isumi, Aichi-ken (JP); Kou Hirano, Mie-ken (JP)

(73) Assignees: Toyota Jidosha Kabsuhki Kaisha, Toyota-shi, Aichi-ken (JP); Nagoya Electric Works Co. Ltd., Nagoya-shi, Aichi-ken ( * ) Notice: Subject to any disclaimer, the term of this patent is extended or adjusted under 35 U.S.C. 154(b) by 33 days.

(21) Appl. No.: 10/646,942

(22) Filed: Aug. 21, 2003

(65) Prior Publication Data

US 2004/0220770 A1  Nov. 4, 2004

(30) Foreign Application Priority Data

Aug. 22, 2002  (JP) .............................. 2002-242544

(51) Int. Cl.
   *G06F 17/18* (2006.01)
(52) U.S. Cl. ...................................... 702/179
(58) Field of Classification Search ................ 702/193, 702/35, 45, 57–59, 66, 71, 76, 81–83, 90, 702/11, 179–183, 189; 700/52; 375/341
   See application file for complete search history.

(56) References Cited

U.S. PATENT DOCUMENTS

| | | | |
|---|---|---|---|
| 5,864,834 A * | 1/1999 | Arai | 706/16 |
| 6,584,413 B1 * | 6/2003 | Keenan et al. | 702/28 |
| 6,606,579 B1 * | 8/2003 | Gu | 702/181 |
| 6,842,702 B2 * | 1/2005 | Haaland et al. | 702/18 |
| 6,868,342 B2 * | 3/2005 | Mutter | 702/21 |
| 7,194,369 B2 * | 3/2007 | Lundstedt et al. | 702/104 |
| 2002/0131644 A1 * | 9/2002 | Takebe | 382/228 |
| 2003/0043939 A1 * | 3/2003 | Okumura et al. | 375/341 |
| 2003/0187584 A1 * | 10/2003 | Harris | 702/19 |
| 2004/0072143 A1 * | 4/2004 | Timmis et al. | 435/4 |

FOREIGN PATENT DOCUMENTS

| | | |
|---|---|---|
| JP | 06-174444 | 6/1994 |
| JP | 08-0254501 | 10/1996 |
| JP | 09-229644 | 9/1997 |
| JP | 10-327000 | 12/1998 |

* cited by examiner

*Primary Examiner*—Eliseo Ramos Feliciano
*Assistant Examiner*—Mohamed Charioui
(74) *Attorney, Agent, or Firm*—Finnegan, Henderson, Farabow, Garrett & Dunner, LLP

(57) ABSTRACT

If a threshold discrimination is performed with variable Z=0 using discriminant analysis, that is useless unless know-how is accumulated through visual judgment and actual operation. A discriminant function is computed using a plurality of parameters which make pass/fail judgment factors and the results of that pass/fail judgment. With respect to the discriminant function, a histogram is generated for pass category and for fail category. Then, a threshold is determined based on the standard deviation in the individual categories so that an intended rate of flowout and rate of overcontrol will be obtained. The acceptability of pass/fail judgment objects is judged based on the threshold. Thus, the rate of flowout and the rate of overcontrol can be controlled as intended. Further, high-performance pass/fail judgment can be implemented without accumulating know-how.

38 Claims, 22 Drawing Sheets

Non-defective

6655444333322000066
A        B       C

Defective (lift-off)

0223334445666666DD

Defective (insufficient solder)

6666666666532066

Defective (component missing)

$$\text{Pass } r_{ij} = \begin{pmatrix} 1 & \text{-----} & & & \\ & 1 & \text{-----} & & r_{ij} \\ & & 1 & & \\ & & & 1 & \\ & & & & \ddots \end{pmatrix}$$

| Pass parameter | 1 | 2 | 3 | 4 | 5 | 6 | 7 | 8 |
|---|---|---|---|---|---|---|---|---|
| 1 | 1 | $r_{12}$ | O |  |  | O |  |  |
| 2 |  | 1 |  | O | O |  |  |  |
| 3 | O |  | 1 |  |  | O | O |  |
| 4 |  | O |  | 1 |  |  |  |  |
| 5 |  | O |  |  | 1 |  |  |  |
| 6 | O |  | O |  |  | 1 | O | O |
| 7 |  |  | O |  |  | O | 1 |  |
| 8 |  |  |  |  |  | O |  | 1 |
| Pass total N | 3 | 3 | 4 | 2 | 2 | 5 | 3 | 2 |

| Fail parameter | 1 | 2 | 3 | 4 | 5 | 6 | 7 | 8 |
|---|---|---|---|---|---|---|---|---|
| 1 | 1 |  |  |  |  | O | O |  |
| 2 |  | 1 | O |  |  |  |  |  |
| 3 |  | O | 1 |  |  |  |  |  |
| 4 |  |  |  | 1 |  | O | O | O |
| 5 |  |  |  |  | 1 |  |  |  |
| 6 | O |  |  | O |  | 1 |  |  |
| 7 | O |  |  | O |  |  | 1 |  |
| 8 |  |  |  | O |  |  |  | 1 |
| Fail total N | 3 | 2 | 2 | 4 | 1 | 3 | 3 | 2 |
| Pass + Fail total N' | 6 | 5 | 6 | 6 | 3 | 8 | 6 | 4 |

PASS/FAIL JUDGMENT DEVICE, PASS/FAIL JUDGMENT PROGRAM, PASS/FAIL JUDGMENT METHOD, AND MULTIVARIATE STATISTICS ANALYZER

BACKGROUND OF THE INVENTION

1. Field of the Invention

The present invention relates to a pass/fail judgment device, a pass/fail judgment program, a pass/fail judgment method, and a multivariate statistics analyzer.

2. Description of the Prior Art

At plants for manufacturing various types of products, usually, pass/fail check is carried out before products are shipped. There are a variety of pass/fail check items. Dependence on humans' visual observation will make it difficult to check a large quantity of products at high speed and increase cost. Especially, if there are a great many check items, conducting visual pass/fail check is virtually impossible. To cope with this, a variety of pass/fail judgment devices which automatically carry out pass/fail check on various types of products have been provided.

Automation of pass/fail judgment involves a problem with respect to pass/fail judgment devices. In general, it is very difficult to clearly define what state of product should be considered as passed state or failed state based on objective criterion when a judgment device is constructed. When a device is constructed, a pass/fail judgment rule might be specified from a personal point of view. Even so, the rule is rarely applicable to every state and the pass/fail judgment device is rarely usable. Pass/fail judgment on test objects which can have a wide variety of product form, such as inspection of the state of soldering of mounted components, is especially difficult.

FIG. 22 is an explanatory drawing illustrating various types of the state of various components soldered onto a print circuit board (hereinafter just a board). The drawing shows the components viewed from the side of the board. In the uppermost column of the figure, a resistance element 1 favorably soldered onto a board is depicted on the left side and an element 1 with its contact lifted off on the right side. In the favorable state on the left side, the upper face of the solder 1a is recessed. In the lift-off state on the right side, the upper face of the solder 1b is projected. When the favorable state and the lift-off state are compared with each other, it is revealed that these pieces of solder are different in form at least the ends 1c and 1d of the solder. It is required to gather data sufficient to characterize this difference in form. Further, it is required to specify a pass/fail judgment rule which characterizes this difference in form.

In the second column of FIG. 22, a resistance element 1 favorably soldered onto a board is depicted on the left side and an element 1 with solder missing on the right side. When the favorable state and the solder missing state are compared with each other, it is revealed that they are obviously different in the form and quantity of solder in solder placement positions 1e. Further, in the third column of FIG. 22, a resistance element 1 and a resistance element 2 different in size from the resistance element 1 are depicted as soldered onto respective boards. Both the elements are favorably soldered. However, since the resistance elements 1 and 2 are different in size, they are also different in the quantity of solder and the inclination of the upper faces thereof. The upper face of the solder 2a on the resistance element 2 is more steeply inclined.

In the lowermost column of FIG. 22, mounted components 3 and 4 different in form are depicted as soldered onto respective boards. Again, both the components are favorably soldered. However, since the mounted components 3 and 4 are different in form, they are also different in the quantity of solder and the angle of the upper faces thereof. As mentioned above, the form or quantity of solder differs depending on whether the solder is good or bad and the form of the components. With respect to actual soldering, the form of the solder varies even with the same phenomenon, for example, the same lift-off. When a pass/fail judgment device is operated, it is required to gather data sufficiently to characterize the differences in the form of solder. Further, it is required to clarify differences in form based on the data and specify a pass/fail judgment rule for judging pass and fail with reliability.

More specifically, for the individual above-mentioned states, it is required to gather data at different points and specify pass/fail judgment rules for the different points. In case of soldering as illustrated in FIG. 22, it is thought that there are several hundred points (e.g. 200 points) in form which are so characteristic as to judge the acceptability of solder. It is required to extract from these points features which allows precise pass/fail judgment according to the kind of defect and the kind of components. However, it is impossible in practice to extract only appropriate ones from such a great many characteristic forms to specify pass/fail judgment rules. The reason therefor is that: usually, a great many components are mounted on a board, and several hundreds of features are present at the soldering points therefor. In this state, it is virtually impossible to artificially extract appropriate characteristic forms.

To cope with this, pass/fail judgment devices which perform statistical processing with personal points of view avoided as much as possible have been conventionally provided. For example, a pass/fail judgment device which uses discriminant analysis has been provided. The device extracts characteristic forms appropriate to pass/fail judgment from a great many characteristic forms, and makes judgment. One example of the applications of discriminant analysis is that: predetermined measured data acquired from a pass/fail judgment device is converted into a large number of pass/fail judgment parameters (parameters which can represent characteristic forms). Histograms of these parameters are generated for pass category and for fail category. A discriminant function which defines a new variable Z is computed, and pass/fail judgment is made with whether the variable Z is "0" taken as a threshold. The variable Z is a variable which is, when the frequency distributions of pass category and fail category are produced for the variable Z, determined so that both the categories can be separated as much as possible. The variable Z is a linear combination of the above pass/fail judgment parameters.

If threshold discrimination is made with the variable Z=0 in the above-mentioned conventional pass/fail judgment device, high-performance pass/fail judgment is not always implemented. To enhance the performance of pass/fail judgment, know-how must be accumulated through visual observation and actual operation. Further, very fine adjustment on how to select the above parameters and the like must be repeated. In terms of performance, pass/fail judgment is required to minimize a rate of flowout and a rate of overcontrol. Rate of flowout is a rate at which defective articles are judged as passed and let out. Rate of overcontrol is a rate at which acceptable articles are judged as failed and contained. In the above-mentioned conventional example, the enhancement of performance in this sense is very difficult.

The above-mentioned pass/fail judgment on solder will be taken as an example. In this case, various parameters corresponding to various characteristic forms, such as lift-off and solder missing, are selected by discriminant analysis. Then, pass/fail judgment is made depending on whether the variable Z is greater than 0. In this discriminant analysis, Z=0 is a midpoint between the mean value of pass category and the mean value of fail category. Therefore, in threshold discrimination by Z=0, a threshold is determined regardless of rate of flowout or rate of overcontrol, and it cannot be adjusted in advance so that a desired rate of flowout or rate of overcontrol will be obtained. To judge whether a desired rate of flowout or rate of overcontrol has been obtained, the following must be done: it must be verified whether any defective unit is included in solders which were subjected to pass/fail judgment and judged as passed. Further, it must be verified whether any non-defective unit is included in solders which were subjected to pass/fail judgment and judged as failed.

Further, if a desired rate of flowout or rate of overcontrol is not obtained, the following must be done: the method for selecting the above parameters must be changed to modify the discriminant function itself. Then, pass/fail judgment must be made again, and the above-mentioned verification must be repeated. That is, to enhance the performance of a conventional pass/fail judgment device, pass/fail judgment must be repeated by a huge number of times. Further, know-how must be accumulated by trial and error, and appropriate parameters must be selected. In conventional pass/fail judgment devices, the judging capability cannot be enhanced unless pass/fail judgment is actually made by a huge number of times.

The following are materials which may be related to the art of the present invention:

1. JP-A No. 254501/1996 (Date of Publication: Oct. 1, 1996)

The patent application discloses an art for using discriminant analysis in pass/fail judgment on the form of solder.

However, if the techniques disclosed in the patent application are used to obtain a threshold for discriminating between pass and fail, there is a high probability that defectives are let out.

Meanwhile, the present invention is predicated on the distribution of defective after discriminant analysis. Under the present invention, thresholds are set based on the breadth of the distribution and control can be exercised so as to reduce the flowout of defectives.

2. JP-A No. 229644/1997 (Date of Publication: Sep. 5, 1997)

The patent application discloses an art for using cluster analysis in pass/fail judgment on the form of solder.

The cluster analysis and the discriminant analysis may be in common with each other in that both are multivariate analysis.

However, they are completely different from each other in specific techniques and they can be considered to virtually have no commonality.

SUMMARY OF THE INVENTION

The present invention has been made with the above-mentioned problem taken into account. An object of the present invention is to provide a pass/fail judgment device, a pass/fail judgment program, a pass/fail judgment method, and a multivariate statistics analyzer wherein the rate of flowout and the rate of overcontrol can be controlled as intended and high-performance pass/fail judgment can be implemented without accumulating know-how.

To attain the above object, in the present invention, a discriminant function is computed from a plurality of pieces of parameter information and pass/fail judgment result information by multivariate statistics analysis. The discriminant function gives a variable which separates the frequency distribution of pass category and the frequency distribution of fail category from each other. When any value of the variable is taken as the threshold for pass/fail judgment, the threshold is determined as follows: according to statistical parameters related to the frequency distributions of the above categories, the threshold is determined so that a specific distribution probability will be obtained in either of the pass category and the fail category. Then, for individual pass/fail judgment objects, a plurality of pieces of parameter information of a pass/fail judgment object concerned are substituted into the discriminant function. By comparing the thus obtained value with the threshold, pass/fail judgment is made.

At this time, a variable value at which a specific probability distribution will be obtained in the fail category is taken as the threshold. Thus, of the pass/fail judgment objects contained in the fail category, only objects of a specific probability can be judged as passed. In other words, a probability at which defectives are judged as non-defective and let out (rate of flowout) can be converged into an intended value. Further, a variable value at which a specific probability distribution will be obtained in the pass category is taken as the threshold. Thus, of the pass/fail judgment objects contained in the pass category, only objects of a specific probability can be judged as failed. In other words, a probability at which non-defectives are judged as defective and contained (rate of overcontrol) can be converged into an intended value.

In the above-mentioned conventional example, the value "0" of a variable defined by the discriminant function and the variable value for individual pass/fail judgment objects are compared with each other when pass/fail judgment is made. The value "0" of the variable is a value which minimizes a number of misjudgments. Taking this value as the threshold may reduce a rate of misjudgment. However, the most important performance of actual pass/fail judgment devices is to prevent defects from being let out. This is because the intended purpose of a pass/fail judgment device is usually detection of defective units or the like in product inspection or the like. Therefore, determining a threshold from the probability distribution of categories, as in the present invention, a very high-performance pass/fail judgment device can be provided. As mentioned above, a threshold is set so that the probability distributions of categories will hold. Therefore, discrimination between non-defective unit and defective unit is not always stricter on the side of defective unit than on the side of non-defective unit. Naturally, there are cases where it is apparently closer to the side of defective unit than to the intermediate value between non-defective unit and defective unit.

Further, there are cases where it is important to reduce a rate of overcontrol in terms of the performance of a pass/fail judgment device. In this case as well, a variable value at which a specific probability distribution will be obtained in the pass category is taken as the threshold. Thus, a very high-performance pass/fail judgment device can be provided. Further, with a threshold based on probability distribution, the setting of parameter information can be reconsidered when a desired probability distribution is not obtained. In the conventional example, the rate of flowout or rate of overcontrol cannot be grasped in this stage. These rates can be grasped only after operation is actually started.

Therefore, to enhance the performance of a conventional pass/fail judgment device, there is no choice but to accumulate know-how. In the present invention, probability distribution is taken into account. Therefore, according thereto, the setting and the like of the parameter information can be reconsidered until the rate of flowout and the rate of overcontrol can be controlled as intended. Thus, with respect to a pass/fail judgment device, desired performance can be obtained even in the early stage of operation. Whether the enhancement of performance by operation is indispensable is a critical factor related to the value of a pass/fail judgment device. Also, that has great influences on the troublesomeness of operating work in actual operation and cost. In this sense, the constitution of the present invention significantly enhances the value of pass/fail judgment devices.

Further, according to the present invention, multivariate statistics analyses are conducted based on the above parameter information and pass/fail judgment result information. Furthermore, thresholds are determined from statistical parameters. Therefore, if these pieces of information previously provided can be acquired, thresholds can be automatically determined. Thus, if parameter information related to individual pass/fail judgment objects can be acquired, pass/fail judgment can be automatized. The pass/fail judgment device can be applied to an inspecting instrument or the like for acquiring a plurality of pieces of parameter information associated with pass/fail judgment objects. Thus, an inspecting instrument or the like capable of automatic judgment can be provided.

A plurality of pieces of parameter information only have to form pass/fail judgment factors. In the present invention, a discriminant function is computed by multivariate statistics analysis. Therefore, when a discriminant function is computed, necessary parameters can be selected as required. Accordingly, a wide variety of parameters can be adopted as parameter information. By adopting a great many parameters (e.g. 200 parameters), pass/fail judgment can be carried out from a wide variety of points of view. In addition, a room for personal points of view to get in the selection of parameters can be reduced. More specifically, parameters are adopted without verifying in details whether the parameters are appropriate, and appropriate parameters are selected by multivariate statistics analysis. Thus, subjectivity can be avoided and objective judgment be conducted.

The parameter information is information acquired from individual pass/fail judgment objects. When the pass/fail judgment device is applied to a certain type of inspecting instrument, the information can be generated from the inspection data of that inspecting instrument. Naturally, the inspection data may be one piece of data. A plurality of pieces of the parameter information may be generated by gathering data in the inspecting instrument from a plurality of points of view. A plurality of pieces of data obtained from a plurality of inspecting instruments may be utilized to generate parameter information. Further, the pass/fail judgment device may be applied to devices, such as a pattern recognition device, other than inspecting instrument. In this case, when it is judged whether a pattern found in an image is matched with a certain pattern, a plurality of pieces of parameter information may be acquired from the image data of the object judged.

The above pass/fail judgment result information is information which indicates the acceptability of the results of pass/fail judgment. When a concrete value is given to each of a plurality of the parameters, the information indicates whether the result of that pass/fail judgment is pass or fail. It is information which is acquired as the result of pass/fail judgment conducted on a plurality of objects in the initial stage of operation. However, the information can be additionally acquired as operation proceeds. The pass category and the fail category are categories defined by the pass/fail judgment result information. The categories must be classified into two, pass and fail; however, the categories may be further classified. For example, the fail category may divided into subcategories on a cause-by-cause basis. Thus, when concrete values are given to a plurality of the parameter, to which subcategory the judgment result belongs may be stored as a pass/fail judgment result. Naturally, the pass category can be also divided into subcategories.

The discriminant function is a function which separates the frequency distributions of pass category and fail category from each other when frequency distribution is considered for the above variable. These distributions are statistical distributions, and they need not be completely separated from each other. Even if the bottoms of the distributions overlap, the distributions only have to be separated from each other as much as possible (so that the variance/total variance between categories is maximized, for example). The variable is a function of a plurality of the parameters (e.g. linear combination). As a technique for multivariate statistics analysis, discriminant analysis, multiple regression analysis, or the like can be used.

A statistical parameter computing unit only has to be capable of computing the center of the distribution of the above categories and the breadth of the distribution.

For the center of the distribution, mode or median which has an approximate value may be used as well as mean.

Parameters indicating the breadth of the distribution is not limited to standard deviation. Variance or a value with the range divided (by 25% or so, for example) may be used.

A threshold determining unit only has to be capable of taking as a threshold such a variable value that a specific distribution probability will be obtained in the distributions of the above categories. A threshold may be determined so that a predetermined distribution probability will be obtained. Or, the threshold determining unit may be so constituted that the user can input a threshold as required.

A parameter information acquiring unit only has to be capable of acquiring a plurality of pieces of the parameter information with respect to individual pass/fail judgment objects. A case where the pass/fail judgment device of the present invention is applied to the above inspecting instrument will be taken as an example. In this case, a plurality of pieces of parameter information may be generated from inspection data obtained by inspecting individual pass/fail judgment objects with the inspecting instrument. A case where the pass/fail judgment device of the present invention is applied to any other equipment will be taken as an example. In this case, a plurality of pieces of parameter information may be acquired from data specific to individual pass/fail judgment objects. If a plurality of pieces of parameter information can be obtained with respect to individual pass/fail judgment objects, a value in the same dimension as the above variable can be obtained. This is done by substituting the individual parameter values into the above discriminant function which is a function of these parameters. By comparing the value with the threshold defined in the dimension of the variable, pass/fail judgment can be made.

Another embodiment of the present invention may be constituted as follows: the center of the distribution of fail category and distribution parameters which indicate the breadth of the distribution are used as the statistical parameters. Then, such a threshold that the specific distribution probability will be obtained is determined from these statistical parameters. At this time, a variable value equivalent to a value deviated from the center of the distribution of fail category by a constant multiple of the distribution parameter is taken as the threshold. That is, a distribution for a variable defined by the discriminant function is considered, and further, a value deviated from the center of the distribution by a constant multiple of the distribution parameter is taken as a threshold. If standard deviation is adopted as a distribution parameter, the individual values of the standard deviation in normal distribution indicate a probability that a variable value greater than (or a variable value less than) the value occurs. For example, letting the standard deviation be σ, the probability that a variable value not less than 3σ occurs is 0.0013 with 1 taken for the total.

It is assumed that the distribution of fail category becomes a normal distribution. A value deviated from the mean as an example of the center of the distribution by a constant multiple of the standard deviation as an example of the distribution parameter is taken as the threshold. Thus, the probability that pass/fail judgment objects contained in fail category are judged as passed can be controlled by the threshold. At this time, the threshold is determined based on the mean of fail category and the standard deviation. Thus, the probability that pass/fail judgment objects contained in fail category (objects expected to be rejected) are judged as passed and defectives are let out is controlled. The above "rate of flowout" can be controlled as intended, and "rate of flowout" can be known before hand as credible information. Naturally, the same control can be exercised for pass category. More specifically, the mean of pass category and the standard deviation are computed. Then, a value deviated from the mean by a constant multiple of the standard deviation is taken as the threshold. Thus, "rate of overcontrol" can be controlled.

Further, as another embodiment of the present invention, both can be used together. A threshold is determined from the mean of fail category and the standard deviation thereof so that an intended rate of flowout will be obtained. In this case, "rate of overcontrol" with the threshold can be judged when viewed from the pass category side. As a result, it can be judged whether the threshold is favorable from the point of view of "rate of overcontrol." If the "rate of overcontrol" is greater than an intended probability, a plurality of pieces of the parameter information at the discriminant function computing unit can be reconsidered. Or, the discriminant function can be reconsidered or other measures can be taken. Thus, the pass/fail judgment device can be adjusted until the intended "rate of flowout" and "rate of overcontrol" are obtained before the judgment device is actually operated. Therefore, accumulation of know-how is not indispensable for the operation. Further, very high-performance pass/fail judgment can be implemented even in the early stage of the operation of the pass/fail judgment device.

As mentioned above, accumulation of know-how is not indispensable. However, it is desirable to feed back the results of pass/fail judgment during operation to further enhance the performance of pass/fail judgment. A plurality of pieces of parameter information must be judgment factors for judging the acceptability of individual pass/fail judgment objects. To objectively identify the judgment factors, inspection data from the inspecting instrument is converted into parameters by a conversion expression. Further, to judge the acceptability of pass/fail judgment objects from a large number of different points of view, the same inspection data is converted into parameters by a plurality of different conversion expressions. These parameters and conversion expressions are stored on a predetermined storage medium.

A plurality of the above conversion expressions are provided before the operation of the pass/fail judgment device is started. At this time, it is unnecessary to consider in details whether the individual parameters actually and greatly contribute to pass/fail judgment. This is because appropriate parameters can be selected by various techniques for multivariate statistics analysis when the discriminant function is determined. As mentioned above, a plurality of parameters and conversion expressions are provided beforehand and stored on storage media. Thus, high-performance pass/fail judgment is implemented even in the initial stage of operation. With this constitution, inspection data obtained by inspecting individual pass/fail judgment objects with the inspecting instrument is converted by the individual conversion expressions. Then, the results of conversion are additionally stored together with pass/fail judgment results.

In the present invention, multivariate statistics analyses are carried out, and the distributions of the pass category and fail category are statistically analyzed. Therefore, the accuracy of statistics is enhanced with time by additionally storing new data one after another in actual operation. With this constitution, the accuracy of statistics is enhanced with time by additional storage of data, as mentioned above. Therefore, there is no room for personal points of view to get in the enhancement of the performance of pass/fail judgment. Thus, the accuracy of statistics can be enhanced with efficiency. The inspecting instrument only has to obtain inspection data about pass/fail judgment objects, and there is no limitation on the embodiments thereof. The inspecting instrument and the pass/fail judgment device may be embodied as separate apparatuses. They may communicate data with each other through two-way communication, or may constituted as a single unit.

There are various constitutions suitable for enhancing the performance of judgment with the operation of the pass/fail judgment device. An example is such a constitution that the result of visual pass/fail judgment is incorporated. More specifically, the result of visual pass/fail judgment is inputted, and this judgment result as well as the parameter information thereof are additionally stored. Further, if the judgment by the threshold and the visual judgment are discrepant, the result of visual pass/fail judgment is taken as proper judgment result. That is, the result of visual judgment is a practical and reliable judgment result on pass/fail judgment objects. If the judgment by the threshold and the visual judgment are different from each other, it turns out that the judgment by the threshold is an error.

If pass/fail judgment is made with the threshold, a plurality of pieces of the parameter information acquired from individual pass/fail judgment objects are different. Variable values obtained by substituting these parameters into the discriminant function are different from one pass/fail judgment object to another. A pass/fail judgment result concluded from this value by the threshold is the result of pass/fail judgment by "likelihood" according to the above distribution probability. With that, accurate pass/fail judgment result information about individual pass/fail judgment objects is visually grasped. Thereby, accurate pass/fail judgment information can be reliably correlated to variable values obtained from the discriminant function with individual parameters.

Therefore, by additionally storing the result of visual pass/fail judgment in correlation with parameter information, the accuracy of statistics can be further enhanced when a discriminant function is computed at the discriminant function computing unit. To incorporate pass/fail judgment result information when the discriminant function is computed, various techniques are available. A case where a pass/fail judgment object is judged as passed in pass/fail judgment by the threshold but is visually found to be failed will be taken as an example. In this case, it turns out that the pass/fail judgment by the threshold does not accurately function with respect to the pass/fail judgment object. Information that the result of visual judgment is correct is additionally stored one by one, and, based on the additionally stored pass/fail judgment result information, a discriminant function is computed. Thus, the accuracy of statistics is enhanced with increase in the number of additionally stored pieces of information.

Needless to say, a new discriminant function may be computed after the results of visual judgment on statistically significant population parameters are accumulated. This is the same with cases where objects are judged as failed by the threshold and as passed by visual judgment.

There are various possible causes of a pass/fail judgment object being passed or failed. In the present invention, as mentioned above, pass/fail judgment results are classified into pass category and fail category when a discriminant function is computed. Thus, discriminant functions can be computed which make it possible to comprehensively and accurately make pass/fail judgment with respect to all the causes of defects. However, by defining discriminant functions on a cause-by-cause basis, pass/fail judgment can be made with higher accuracy. Consequently, as another embodiment of the present invention, the causes of visual pass/fail judgment and judgment results may be inputted. Thus, discriminant functions can be computed which separate pass category and fail category divided into subcategories on a cause-by-cause basis.

When a discriminant function is computed, the parameter information is appropriately selected, and further, a variable which separates pass category and fail category is computed. If discriminant functions are computed on a cause-by-cause bases, as mentioned above, an optimum discriminant function is computed for each subcategory. A case where parameter information is desirable for separating pass category and fail category with respect to some cause but not with another cause will be taken as an example. In this case, desirable parameter information can be selected with accuracy and further a discriminant function which separates pass and fail categories with accuracy can be computed. As a result, pass/fail judgment can be accurately made with respect to all the causes of defects. Further, a probability of misjudgment can be converged into a very small value.

The accuracy of judgment is highly enhanced by the above-mentioned subcategorization. According to the present invention, operation can be started with an intended rate of flowout as mentioned above. Therefore, a pass/fail judgment device which delivers high performance even in the initial stage of operation can be provided even if subcategorization is not performed. Even if such a constitution that the causes of pass/fail judgment and the judgment results are inputted for subcategorization is adopted, it is desirable to do the following: inputting should be performed for a plurality of objects and population parameters should be ensured to the extent that statistical significance is acquired. With such a constitution that the results of visual pass/fail judgment are inputted, a probability of erroneous input tends to increase with increase in the number of population parameters. This is also the case with such a constitution that the causes of pass/fail judgment and the like are inputted. If erroneous input is done, for example, some objects judged as failed will be found in pass category. If the frequency distributions of pass category and fail category are displayed after erroneous input has been done, fail judgment data will be found for a parameter value which should obviously fall in pass category. To cope with this, various constitutions can be adopted. For example, the fail judgment data may be prevented from being used in multivariate statistics analysis at the discriminant function computing unit. Or, the data itself may be deleted from the storage medium.

According to the present invention, parameters can be adopted without verifying in detailed whether the parameters are appropriate and parameters can be selected by multivariate statistics analysis. Thus, subjectivity can be avoided and objective judgment can be conducted. When multivariate statistics analysis is carried out, multicolinearity must be eliminated as preprocessing for selecting parameters. As a concrete example of techniques therefor, unused parameters are determined based on a correlation coefficient in another embodiment of the present invention.

Correlation coefficient is a value obtained by quantifying the strength of correlation between two variables (e.g. a tendency that the value of one parameter increases with increase in the value of the other parameter). If a plurality of parameters strongly correlated with one another are used, a discriminant function which allows accurate pass/fail judgment cannot be computed in some cases. To cope with this, parameters having values with which the correlation coefficient exceeds a certain value are removed in decreasing order of the numbers thereof. In the present invention, however, a discriminant function capable of giving histograms with respect to pass category and fail category is required. Therefore, parameters common to both the categories must be left. Consequently, the number of parameter values with which the correlation coefficient exceeds a predetermined value is summed up with respect to both the categories. Then, the parameters are disused in decreasing order of the sums, and thus multicolinearity is effectively eliminated.

As another example of techniques suitable for eliminating multicolinearity, parameters may be disused in increasing order of priorities according to predetermined priorities. This constitution is preferably used together with the above constitution that parameter values giving high correlation coefficients are summed up. More specifically, with the constitution that parameters are disused in decreasing order of the sums, unused parameters can be determined according to priorities when the parameters have the same sum. Thus, multicolinearity can be eliminated with ease.

Further, in another concrete example of the application of the pass/fail judgment device of the present invention, a pass/fail judgment object is irradiated with specified electromagnetic waves. Thus, reflected electromagnetic waves or transmitted electromagnetic waves corresponding to the form of the pass/fail judgment object are produced. Therefore, electromagnetic wave data corresponding to the form of the pass/fail judgment object can be obtained. This is done by generating electromagnetic wave data indicating the detection value of the reflected electromagnetic waves or transmitted electromagnetic waves. Therefore, a value corresponding to the form of the pass/fail judgment object can be obtained. This is done by converting the reflected electromagnetic wave data or transmitted electromagnetic wave data by a predetermined conversion expression.

There are a plurality of possible conversion expressions. Pass/fail judgment objects can be grasped by a plurality of values corresponding to the form thereof. Therefore, a pass/fail judgment device which takes the form of pass/fail judgment objects as a pass/fail judgment factor can be provided. This is done by turning a value corresponding to the form of a pass/fail judgment object into a plurality of pieces of parameter information. There are various examples of the application of the pass/fail judgment device which takes the form of pass/fail judgment objects as a pass/fail judgment factor. Such examples include a device for judging the acceptability of soldering based on the form of the contacts of mounted components on a board and solder. Another example is a device for judging the acceptability of print based on the form of solder paste printed on a board before components are mounted.

For the latter, an embodiment in which the acceptability and unacceptability of soldering after components are mounted are classified into pass category and fail category may be adopted. More specifically, judgment may be made on the acceptability of soldering after components are mounted, not on the form of the paste itself. Then, the acceptability of the form of the paste may be thereby indirectly judged. This can be used in cases where the form of the paste has great influences on soldering itself when components are mounted. In these cases, pass/fail judgment is made by utilizing the fact that the acceptability of soldering is closely related with the acceptability of paste. In the present invention, electromagnetic waves of a variety of wavelengths can be adopted. Available electromagnetic waves include visible light, infrared rays, and X-rays. Further, a variety of embodiments can be adopted. Electromagnetic waves are reflected or transmitted depending on the properties of electromagnetic waves and materials of pass/fail judgment objects. Reflected waves or transmitted waves can be utilized depending on the properties of electromagnetic waves and the materials of pass/fail judgment objects as appropriate.

For example, when visible light, infrared rays, or the like is applied to metal, reflected light is obtained. Therefore, reflected light can be detected. When a beam of X-rays is applied to metal, transmitted X-rays can be obtained with a predetermined transmissivity. Therefore, transmitted X-rays can be detected. Needless to say, reflected X-rays may be utilized. There are a variety of techniques available for the detection of electromagnetic waves. For example, a pass/fail judgment object may be linearly or planarly swept with a laser beam with a reduced diameter, and reflected light may be detected by a sensor installed in a specific position. A pass/fail judgment object may be irradiated with X-rays on one side, and transmitted X-rays may be detected by CCD sensors two-dimensionally placed on the opposite side. The image of a pass/fail judgment object illuminated with visible light may be picked up by CCD sensors. A variety of values can be adopted as a value corresponding to the form of pass/fail judgment objects. Change in the inclination may be estimated by continuous change in reflected electromagnetic waves to compute the height. The length of solder may be estimated from the point of start of reflection in the direction of inclination. Needless to say, other values characterizing a variety of forms can be taken as parameter information.

Thus, the pass/fail judgment device can be applied to a device which detects the reflection of irradiated electromagnetic waves and generates reflected electromagnetic wave data. As an example of the constitution suitable for such an application, the influence of multiple reflection may be removed. If a plurality of pass/fail judgment objects are placed in a specific narrow place, electromagnetic waves which have arrived at a pass/fail judgment object may reaches another pass/fail judgment objects by reflection. Further, the electromagnetic waves reflected by the another pass/fail judgment object may reach an electromagnetic wave detecting unit. There are cases where electromagnetic waves reach an electromagnetic wave detecting unit by two or more times of reflection, as mentioned above. If such multiple reflection occurs, the reflected electromagnetic wave data is different from data obtained when multiple reflection does not occur.

Using this data as it is degrades the accuracy of statistics. To cope with this, the arrangement of pass/fail judgment objects wherein multiple reflection can occur is grasped by an arrangement analyzing unit. Then, parameters to which multiple reflection greatly contributes for these pass/fail judgment objects are disused or given a lower priority. Thus, the influences of the parameters can be removed or reduced. Needless to say, such a constitution that different thresholds are computed for a point of the occurrence of multiple reflection and for a point of the nonoccurrence thereof may be adopted.

The pass/fail judgment device of the present invention may be used alone or as incorporated in some equipment. In terms of the philosophy lying under the present invention, the embodiments thereof are not limited to these, and a variety of other embodiments are possible. Therefore, the present invention can be embodied in a variety of forms, including software and hardware, as appropriate. If the philosophy of the present invention is embodied as software for controlling a pass/fail judgment device, the present invention exists on a recording medium with such software recorded thereon. In this case, the present invention is used in the form of recording medium, and holds as the software itself.

Needless to say, the recording medium for this program may be a magnetic recording medium or magneto-optic recording medium. The same thought holds for every recording medium that will be developed in the future. It holds in the stages of reproduction, such as primary copy and secondary copy, without doubt. The program may be supplied using a communication line. In this method, the present invention is utilized using the communication line as a transmission medium. Further, the present invention can be embodied partly as software and partly as hardware. In this case as well, the embodiment is completely the same in terms of the philosophy lying under the present invention. Therefore, such a constitution that part of the program is stored on a recording medium and read out as required may be adopted.

Further, in control of the pass/fail judgment device, each unit carries out processing according to a predetermined control procedure. Naturally, the present invention lies in the procedure, and it is applicable as a method as well.

BRIEF DESCRIPTION OF THE DRAWINGS

FIG. 18 is a drawing illustrating the correlation coefficient matrices of pass category.

DESCRIPTION OF THE PREFERRED EMBODIMENTS

Here, embodiments of the present invention will be described in the following order.

(1) General Constitution of Present Invention:

(2) Constitution of Laser Inspecting Instrument:

(3) Constitution of Data Accumulation Device:

(4) Constitution of Visual Judgment Result Input Device:

(5) Constitution of Multivariate Statistics Analyzer:

(6) Other Embodiments:

(1) General Constitution of Present Invention

Figure 1:
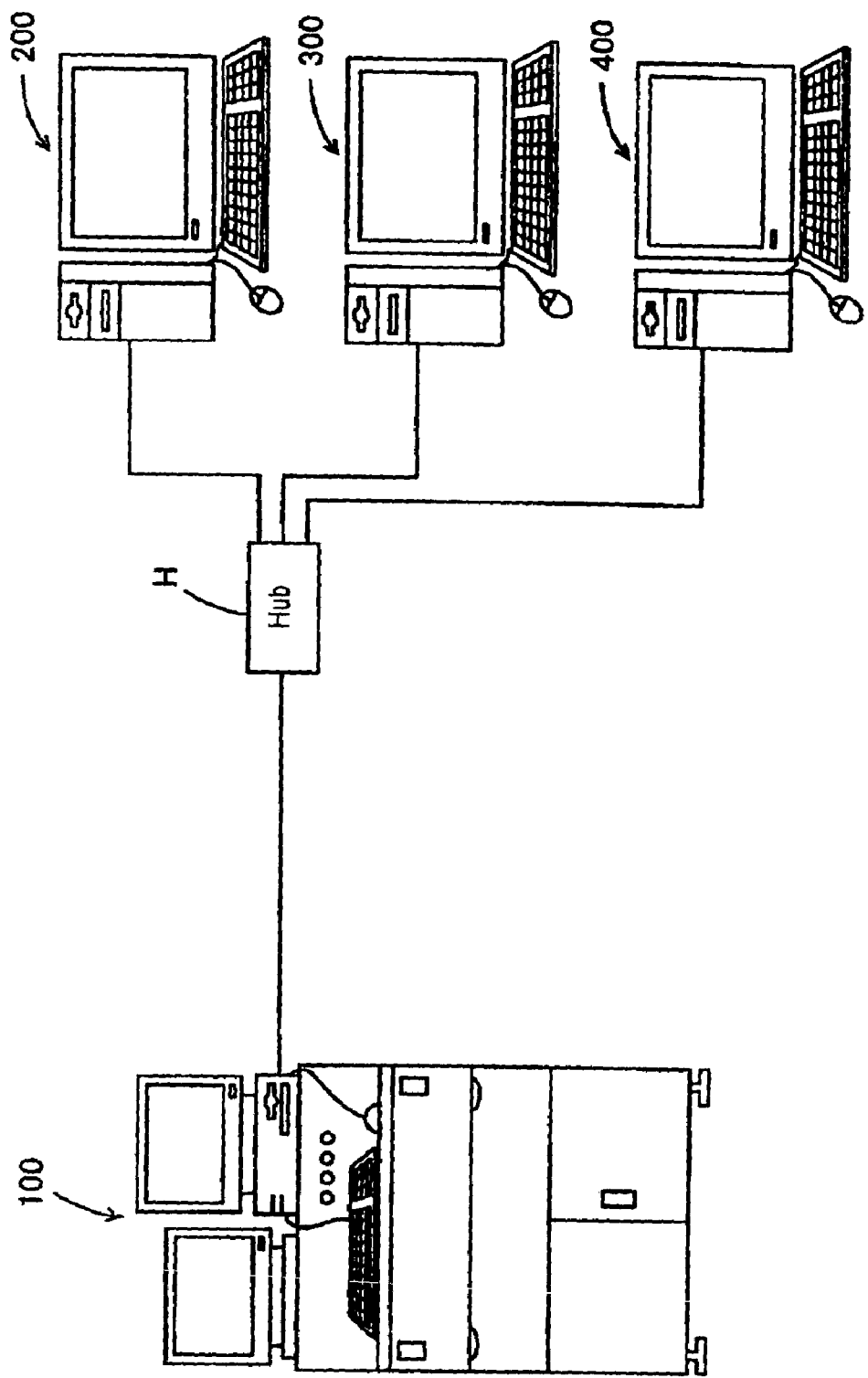
FIG. 1 is a drawing schematically illustrating the hardware configuration of a system comprising the pass/fail judgment device.

FIG. 1 is a schematic diagram of a system comprising the pass/fail judgment device of the present invention. This system comprises a laser inspecting instrument 100, a data accumulation device 200, a visual judgment result input device 300, and a multivariate statistics analyzer 400. Each of them is connected with a communication line through a hub H. In other words, the individual devices are capable of two-way communication with one another through the communication line. The laser inspecting instrument 100 is a device which reads a label stuck to each board to recognize the contacts of each component mounted on the board. The device applies a laser to the vicinity of each of the contacts.

Figure 2:
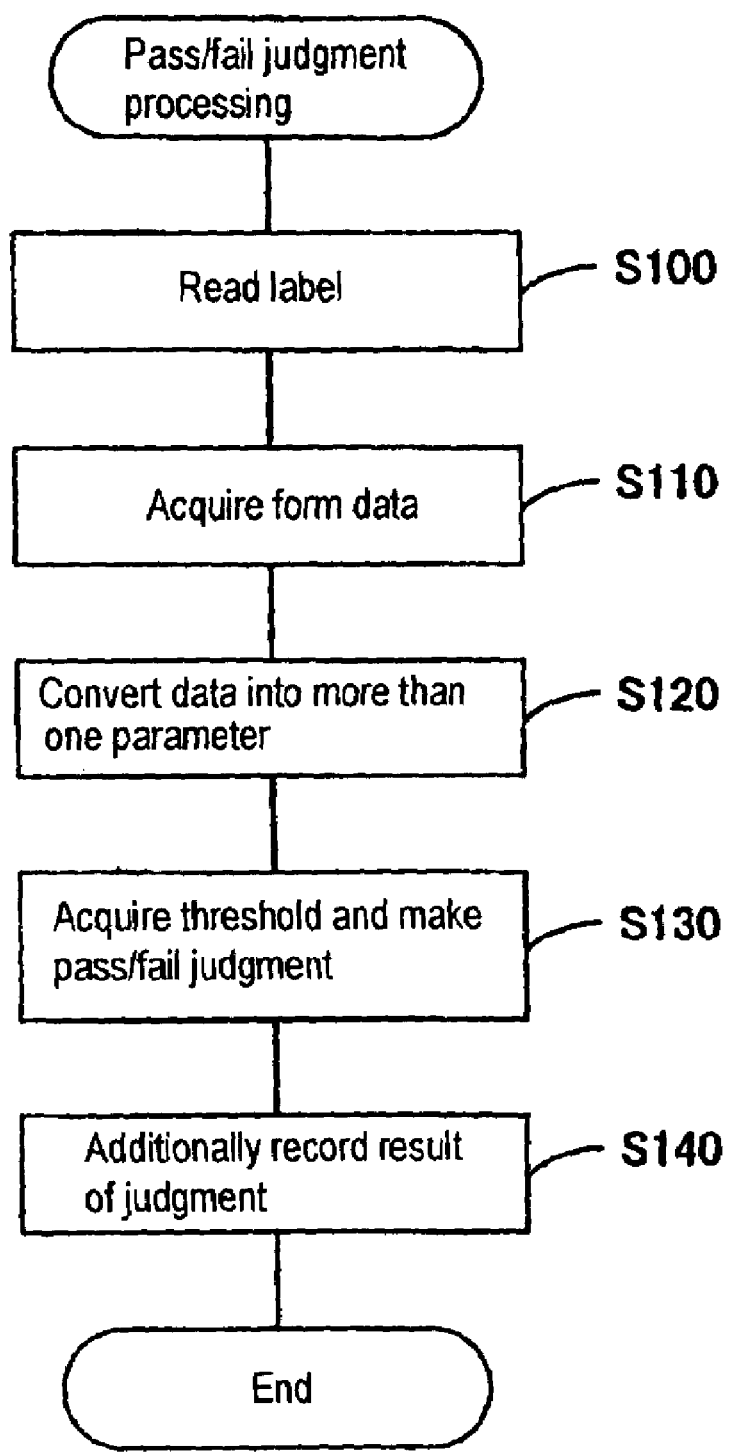
FIG. 2 is an outline flowchart of the operation of a laser inspecting instrument.

According to the present invention, pass/fail judgment is carried out by the laser inspecting instrument 100. The processing procedure therefor is substantially in accordance with the flow in FIG. 2. At Step 100, the label stuck to the board is read to identify the board as well as the mounting positions, types, and the like of components. That is, the label contains information for identifying the type of each board. In this embodiment, the label also contains information (e.g. serial number) for identifying each board in addition to information for identifying the type of the board. The individual boards can be identified by the information for identifying each board, and pass/fail judgment results can be recorded or displayed on a board-by-board basis.

Further, the technique for identifying boards is not limited to the above-mentioned embodiment, and a variety of embodiments can be adopted therefor. For example, such a constitution that labels containing known serial numbers and the like may be stuck after inspection by the laser inspecting instrument 100 may be adopted. The contacts of the individual components are secured on the board with solder, and an applied laser is reflected in the vicinities of the contacts. The laser inspecting instrument 100 is capable of sweeping the vicinities of the contacts with a laser and detecting reflected light while recognizing the direction of reflection. At Step 110, the detection value of reflected light, produced by this sweeping, is acquired as form data.

The form data is different depending on the solder form in the vicinity of each contact. At Step 120, the form data is converted into a plurality of parameters which make pass/fail judgment factors. Multivariate statistics analysis on each parameter is carried out beforehand at the multivariate statistics analyzer 400. A threshold for the judgment of acceptability is determined in advance as the result thereof. In this embodiment, this threshold is defined in the dimension of the discriminant function. Further, the discriminant function is a function of the parameters computed at Step 120. Pass/fail judgment is carried out by comparing the value computed by substituting the parameters into the discriminant function with the threshold at Step 130. The result of the judgment is shown on the display unit mounted on the laser inspecting instrument 100. The user can know pass or fail by viewing the screen on the display unit. Needless to say, the result of pass/fail judgment may be displayed on a component-by-component basis. Or, the result on one board may be displayed in one display image. Or, display may be made only when fail judgment occurs.

In this embodiment, a measure is taken to enhance the accuracy of statistics. Information on pass/fail judgment objects subjected to pass/fail judgment at Step 130 is accumulated as follows: Pass/fail judgment result information on the soldered joint of each contact of each component and the parameter information thereof are accumulated as correlated with each other in the data accumulation device 200. Further, in the data accumulation device 200, varied data required for the operation of the pass/fail judgment device in this embodiment is stored in the form of database. Varied data acquired from the laser inspecting instrument 100, the visual judgment result input device 300, and the multivariate statistics analyzer 400 can be accumulated therein. Accumulated data can be outputted as required. In this embodiment, the form data is stored in correlation with the parameter information. (This is not shown in the figure.) By operating an input device, such as a keyboard, on the data accumulation device 200, the form data can be indicated on the display unit. Thus, it can be checked after the fact whether individual parameters computed from individual pieces of form data are probable values.

The visual judgment result input device 300 is so constituted that the results of visual pass/fail judgment can be inputted. Thus, if any error occurs in automatic pass/fail judgment, the data concerned can be corrected to enhance the accuracy of statistics. For the computers installed in the laser inspecting instrument 100, the data accumulation device 200, the visual judgment result input device 300, and the multivariate statistics analyzer 400, general-purpose computers can be used. Therefore, the detailed description of the hardware will be omitted.

Further, in the system in this embodiment, the individual devices perform processing in a distributed manner. Needless to say, these devices may be constituted of a single computer, or may be constituted of two or more or three or more specific computers. In this embodiment, such a threshold as to give a specific distribution probability in pass and fail categories is determined with the above-mentioned constitution. Thus, the rate of flowout and the rate of overcontrol can be controlled with ease, and a system wherein the accumulation of know-how is not indispensable is provided. The individual devices will be described in details below.

(2) Constitution of Laser Inspecting Instrument

Figure 3:
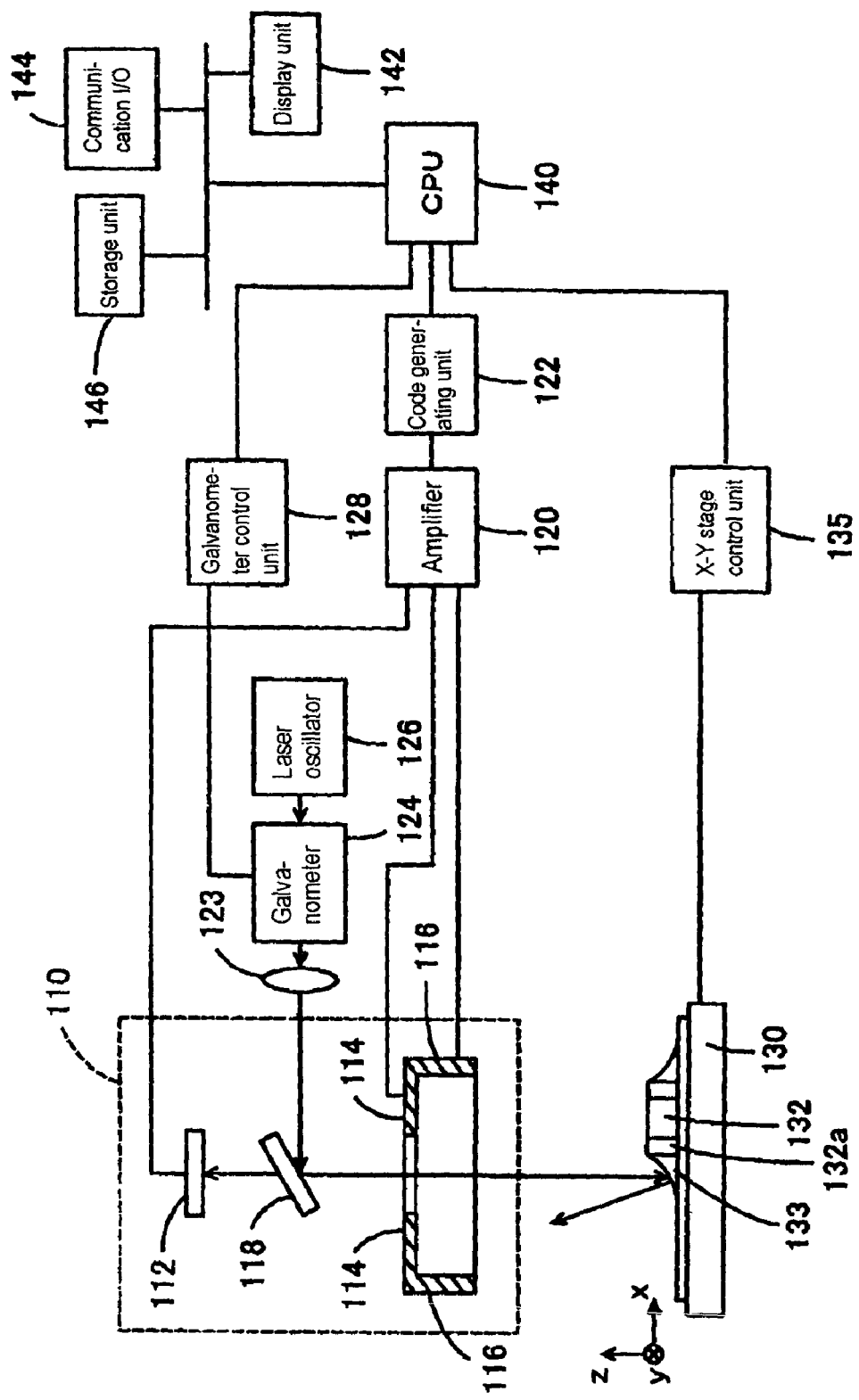
FIG. 3 is a drawing schematically illustrating the constitution of the laser inspecting instrument.

FIG. 3 illustrates the general constitution of the laser inspecting instrument 100. On the left side in the figure, an optical system is schematically depicted, and on the right side, a control system is depicted. The laser inspecting instrument 100 comprises a laser oscillator 126, and is capable of oscillating and outputting predetermined laser light. A galvanometer 124 has two angle-adjustable mirrors therein, and the orientation angles of the angle-adjustable mirrors can be adjusted under the control of a galvanometer control unit 128.

That is, the orientation angle of laser light outputted from the galvanometer 124 can be adjusted by adjusting the orientation angles of the angle-adjustable mirrors. Thus, sweeping to be described later is implemented. The laser light outputted from the galvanometer 124 is collected by a lens 123, and then launched into a photo acceptance box 110. Therefore, a beam of laser light comes in the photo acceptance box 110, and sweeping is performed in this state. Consequently, sensors to be described later can detect laser light corresponding to the microscopic state of the vicinity of solder 133. Sweeping is performed from the contact side toward the body of the component, as described later, and the track thereof forms one line. If necessary under any condition, such as a component calling for high-accuracy sweep data, information on a virtual plane may be acquired by performing sweeping so that two or more lines will be formed.

Figure 4:
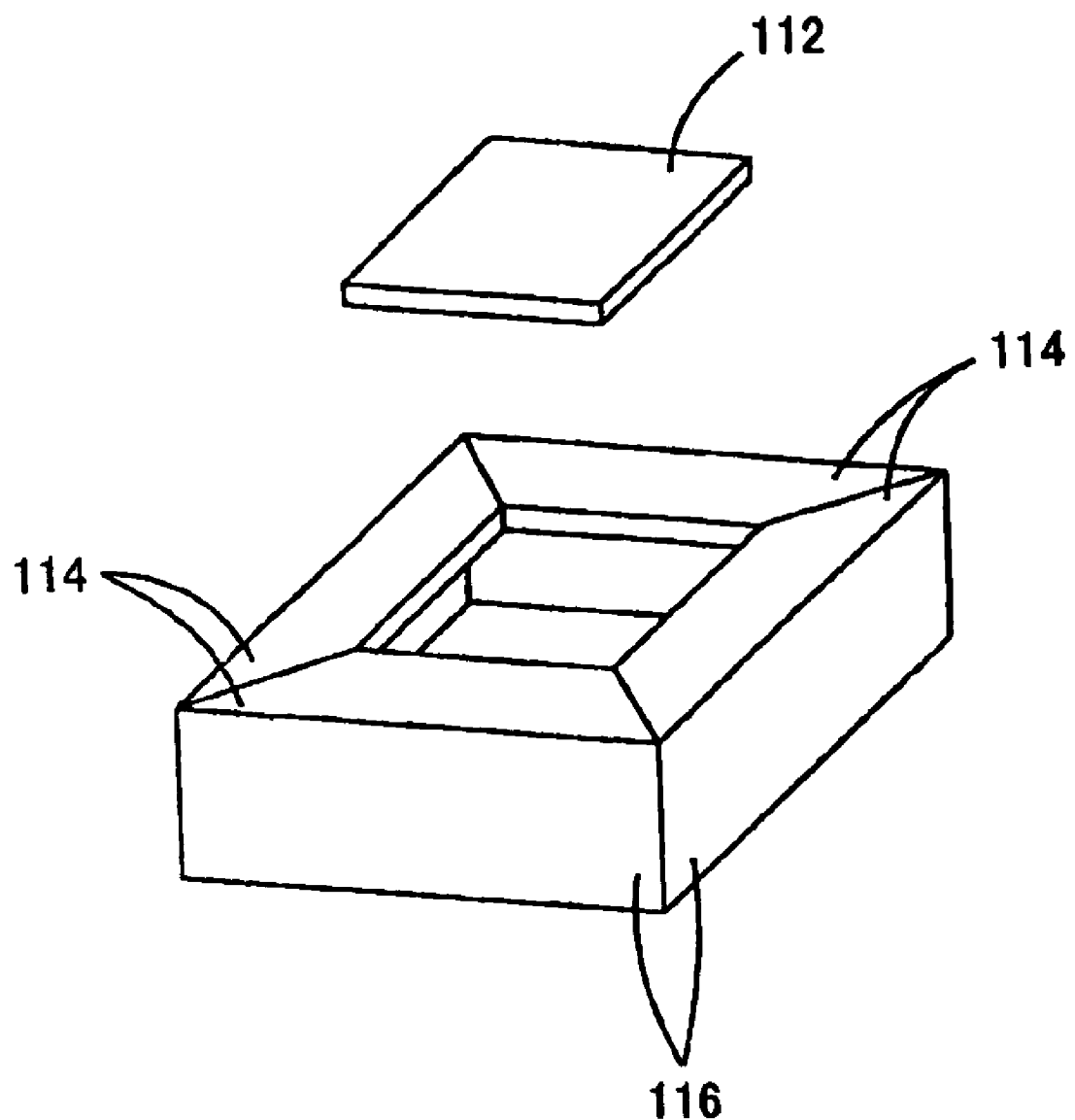
FIG. 4 is a drawing illustrating the positional relation among sensors.

The photo acceptance box 110 is equipped with a device. The device is for forming an appropriate optical path of laser light and acquiring information about the presence/absence of reflected light as well as the direction thereof. A top sensor 112 is placed at the upper part of the interior of the photo acceptance box 110, and up sensors 114 and side sensors 116 are placed thereunder. FIG. 4 is a drawing illustrating the positional relation among these sensors. The up sensors 114 form a rectangular hole in the center of them, and the side sensor 116 are formed on the four side faces beneath the up sensors 114.

The top sensor 112 is in the shape of rectangular flat plate, and is placed above the rectangular hole formed in the center of the up sensors 114 with one face thereof oriented downward. The optical path of laser light is formed between the top sensor 112 and the up sensors 114, and a flat plate-like half mirror 118 is placed in the path. The half mirror 118 is so oriented that the flat face thereof forms an angle of approx. 45° to the under surface of the top sensor 112 and laser light from the lens 123 is reflected and caused to travel downward. The bottom of the photo acceptance box 110 is open. Therefore, laser light can travel downward from inside the photo acceptance box 110 and can also travel into the photo acceptance box 110 from beneath.

The half mirror 118 can partly transmit laser light traveling from beneath the photo acceptance box 110, and transmitted laser light travels toward the top sensor 112. The top sensor 112 and the up sensors 114 are capable of detecting laser light applied to the under surfaces thereof. The side sensors 116 are capable of detecting laser light at the opposite surfaces thereof. An X-Y stage 130 is placed under the photo acceptance box 110, and a board mounted with components having contacts as pass/fail judgment objects can be placed on the stage. The X-Y stage 130 is connected with the X-Y stage control unit 135. The X-Y stage 130 can be moved on a X-Y plane by predetermined control signals outputted from the X-Y stage control unit 135.

Therefore, by moving the X-Y stage 130 with a board placed thereon, a desired pass/fail judgment object can be positioned in the laser light path under the photo acceptance box 110. In FIG. 3, a mounted component 132 on the X-Y stage 130 is schematically depicted. The mounted component 132 is a rectangular chip component, and both the ends thereof are contacts 132a. These contacts are to be joined by solder 133.

Laser light reflected by the half mirror 118 travels to under the photo acceptance box 110, and arrives at the vicinity of the solder 133. As a result, the laser light is reflected in the vicinity of the solder 133, and travels upward. The reflected light travels toward the top sensor 112, up sensor 114, side sensor 116, or outside thereof depending on the angle of travel thereof. When the laser light arrives at the top sensor 112, up sensor 114, or side sensor 116, a detection signal is outputted from the sensor concerned.

Figure 5:
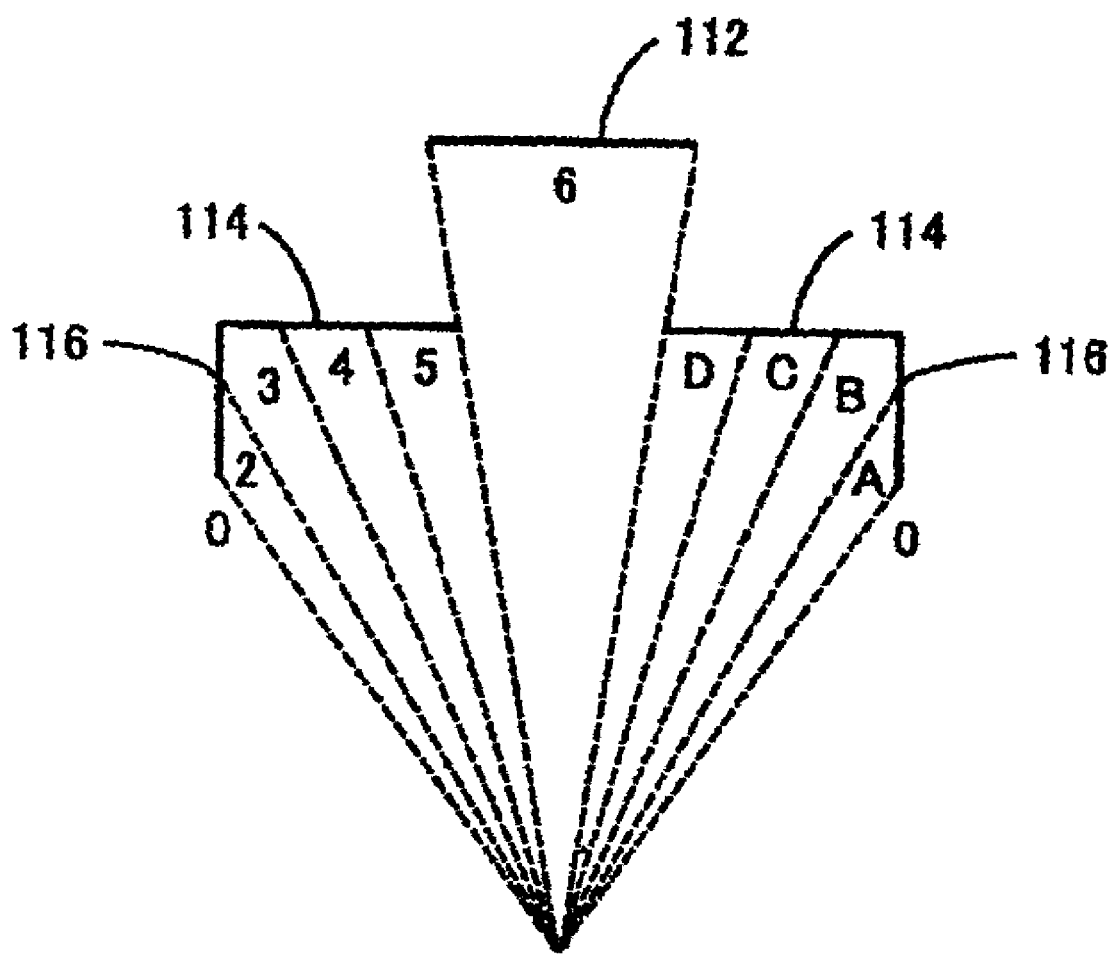
FIG. 5 is an explanatory drawing explaining generated codes.

The sensors are connected with an amplifier 120. The detection signal is subjected to predetermined amplification at the amplifier 120, and inputted to a code generation unit 122. The sensors are capable of detecting the presence/absence of reflected light whose level is equal to or above a predetermined threshold in the respective detection positions. Based on input signals therefrom, the code generation unit 122 generates a code representing the reflection angle of the reflected light. FIG. 5 is an explanatory drawing explaining the generated codes. As illustrated in the figure, if the reflected light is detected by the top sensor 112, code "6" is generated.

For reflected light detected by either of the up sensors 114, a code of "5" to "3" is generated depending on the angle thereof. For reflected light detected by either of the side sensors 116, a code of "3" or "2" is generated. When reflected light is detected by sensors on the opposite side, a code of "A" to "D" is generated. If reflected light travels outside the side sensors 116, code "0" is generated. Since the vicinity of the solder 133 is swept with laser light, a code is generated in each stage of the sweeping. As a result, the code generation unit 122 outputs data containing a plurality of numerical values or alphabetic characters for a run of sweeping. Needless to say, the constitution described here is an example, and the pitch with which the code value fluctuates in the individual sensors may be increased or decreased. Detection may be performed for a plurality of runs of sweeping, not for one run of sweeping. Further, sweeping may be performed in a plurality of directions, not only in one direction.

The code generation unit 122, the galvanometer control unit 128, and the X-Y stage control unit 135 are connected with CPU 140. The units are controlled according to control signals outputted by the CPU 140, and output data to the CPU 140. That is, the CPU 140 forms a program executing environment, together with ROM (not shown) and RAM (not shown). The CPU 140 executes a predetermined program and further controls the laser inspecting instrument 100 through the code generation unit 122, the galvanometer control unit 128, and the X-Y stage control unit 135.

The CPU 140 performs predetermined processing according to the program, and pass/fail judgment is thereby carried out. The CPU 140 writes required data into the storage unit 146. The CPU 140 communicates with the data accumulation device 200 or the multivariate statistics analyzer 400 through the communication I/O 144 as required. The CPU 140 further displays the results of pass/fail judgment on the display unit 142. The storage unit 146 only has to be a storage medium wherein data can be written and read. Various media, such as hard disk drive, RAM, and ROM, can be adopted as the storage unit. The laser inspecting instrument 100 is equipped with a label reader (not shown). The label reader reads labels stuck to individual boards mounted with pass/fail judgment objects for identifying the boards.

Figure 6:
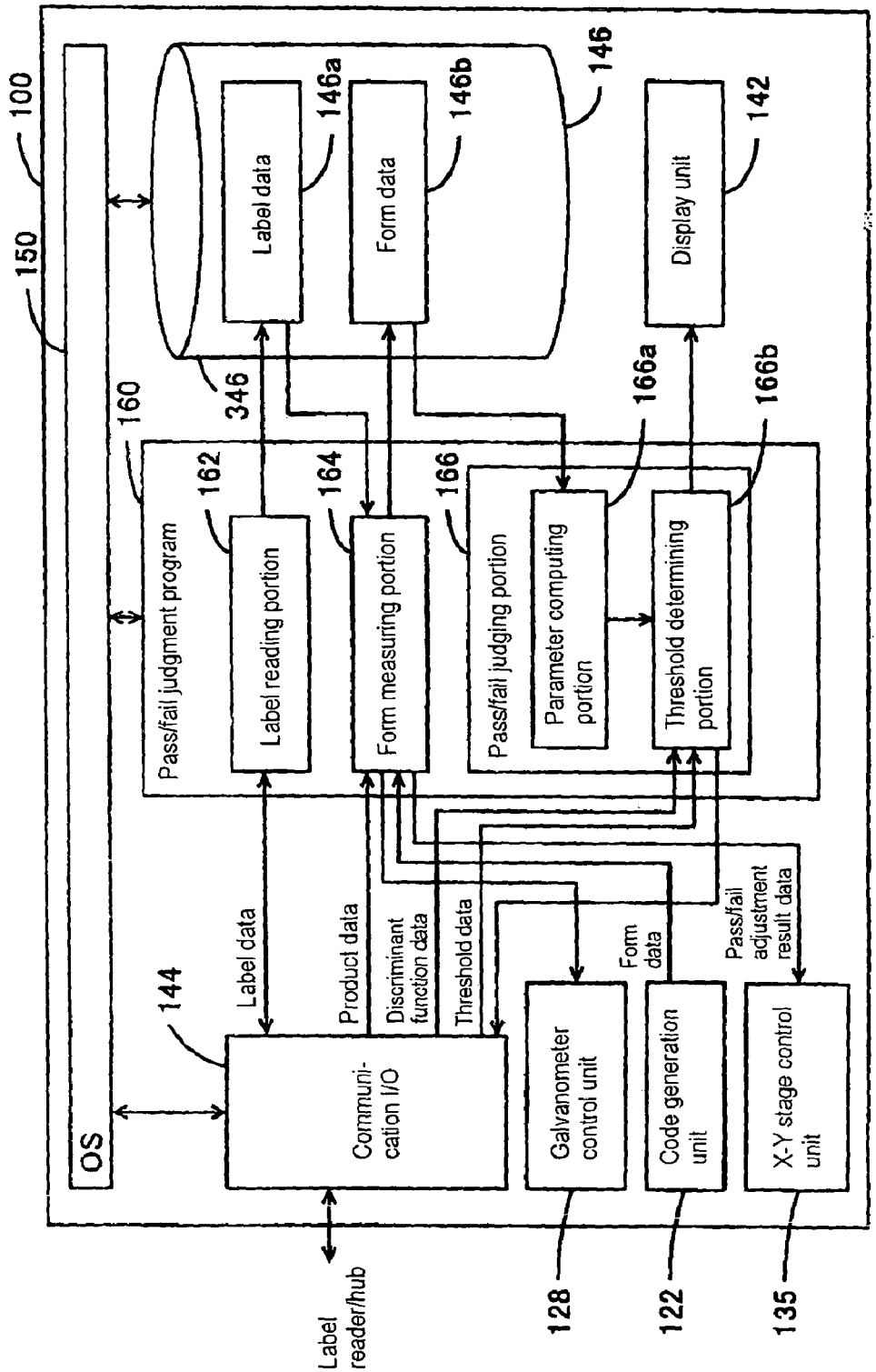
FIG. 6 is a functional block diagram of the pass/fail judgment program.

FIG. 6 is a functional block diagram of the pass/fail judgment program executed at the laser inspecting instrument 100. In the laser inspecting instrument 100, the pass/fail judgment program 160 is executed under the control of OS 150. The OS 150 controls data transmission and reception through the communication I/O 144 and reading of files from the storage unit 146. Further, the OS 150 supplies required data to the pass/fail judgment program 160. In FIG. 6, the direction of data communication at the communication I/O 144, the pass/fail judgment program 160, and the storage unit 146 is indicated by an arrow for the purpose of clarifying the relation in data communication.

The pass/fail judgment program 160 comprises a label reading portion 162, a form measuring portion 164, and a pass/fail judging portion 166. The label reading portion 162 controls the label reader (not shown) through the communication I/O 144 to acquire label data for identifying the label on a board mounted with pass/fail judgment objects. Then, the label reading portion 162 stores the acquired label data in the storage unit 146 (label data 146a). The form measuring portion 164 controls and causes the galvanometer control unit 128 to sweep judgment objects with laser light. The form measuring portion 164 controls and causes the X-Y stage control unit 135 to drive the X-Y stage 130 so that a desired pass/fail judgment object will be irradiated with laser light. Further, the form measuring portion 164 acquires form data comprising the above-mentioned codes outputted from the code generation unit 122 and stores the form data in the storage unit 146 (form data 146b).

Here, the form measuring portion 164 acquires product data on a board identified by the label data 146a through the communication I/O 144. As described later, the product data is data on boards accumulated in the data accumulation device 200. The product data includes the types of components mounted on boards with individual labels, the numbers and relative positions of pins of the components, and the like. The form measuring portion 164 acquires these pieces of data to judges the positions of pins as test objects. Then, the form measuring portion 164 controls the X-Y stage control unit 135 to position the board concerned so that the vicinities of the pin positions can be swept.

The form measuring portion 164 performs the above-mentioned positioning, and further acquires form data 146b on all the test objects on a board concerned. Utilizing these pieces of form data 146b, the pass/fail judging portion 166 performs processing to judge the acceptability of the individual pass/fail judgment objects, that is, soldering on contacts. The pass/fail judging portion 166 comprises a parameter computing portion 166a and a threshold determining portion 166b for this purpose. The parameter computing portion 166a computes parameters from the form data 146b by an expression illustrated in FIG. 8 below or the like. Here, the parameter computing portion 166a converts the form data 146b into a plurality of parameters by a plurality of conversion expressions. These parameters are parameters which represent the form of solder itself and the form of the area around the solder. These parameters take different values depending on the differences in solder form illustrated in FIG. 7 below.

For the parameters, various values can be adopted provided that the values represent the forms of solder and the areas around it. These parameters can make pass/fail judgment factors. However, parameters other than appropriate ones are excluded by techniques for discriminant analysis to be described later. Therefore, it is unnecessary to consider in details whether a parameter is appropriate as a pass/fail judgment factor. A parameter may be adopted as long as the parameter allows the identification of form.

Figure 7:
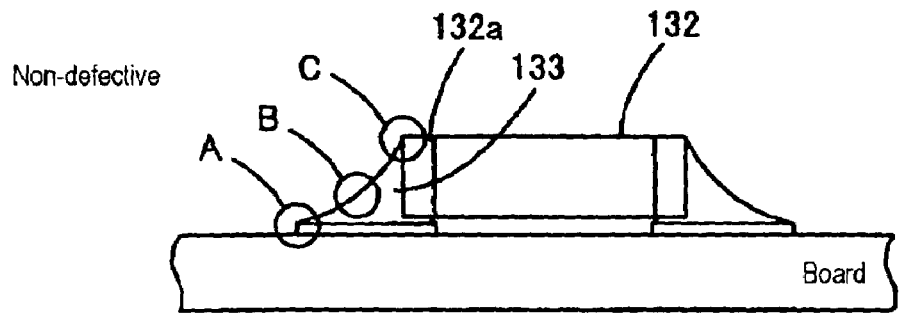
FIG. 7 is an explanatory drawing explaining the non-defective state and defective state of a mounted component.
Figure 7:
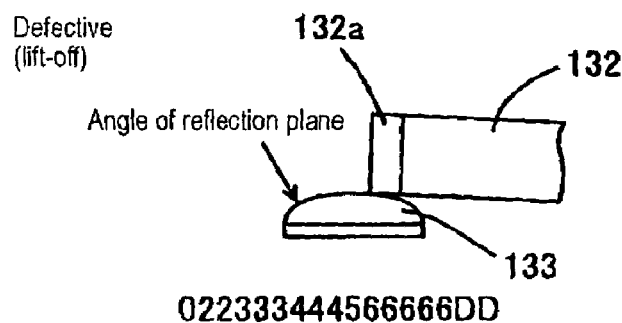
Figure 7:
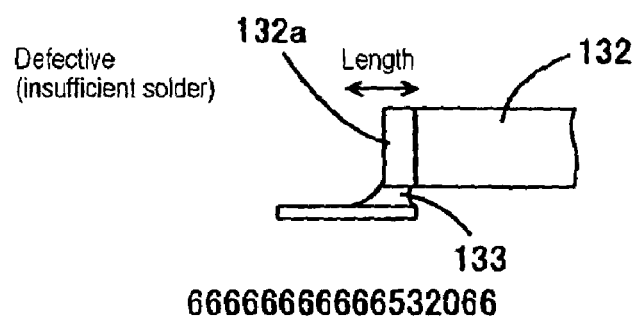
Figure 7:
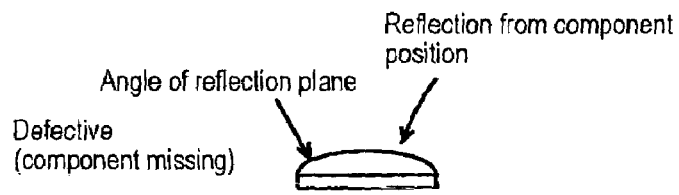

FIG. 7 is an explanatory drawing explaining the non-defective state and three types of defective state of the mounted component 132. As illustrated in the figure, in the non-defective state, the upper face of the mounted component 132 is substantially parallel with the upper face of the board. Further, the solder 133 has gotten under the contact 132a, and the upper face of the solder 133 is concave. The above form data 146b is data based on reflection from points A to C and the contact 132a in FIG. 7, and corresponds to the forms thereof. In the non-defective state in the figure, the codes in the form data 146b are, for example, "66554443332200066" when the object is swept with the laser light from left to right in the figure.

When the features of the form of the solder 133 are grasped, the form can be identified by various features. The form can be identified utilizing, for example, data based on reflection from the positions A to C in FIG. 7. That is, the above codes are numerical values which correspond to the form of the concave face of the solder 133 and are arranged in the order corresponding thereto. In position A in the figure, laser light travels downward substantially perpendicularly to the board plane. Then, the laser light is reflected by the solder 133 and travels upward substantially perpendicularly to the board plane. Therefore, the code value in the vicinity of position A is "6." The inclination of the solder 133 becomes gradually steep. Accordingly, when the solder 133 is swept from position A to position B, the reflected light is oriented to the left side in the figure. Therefore, the codes are given in an increasing sequence and the code value is gradually reduced to "5" to "0." Thereafter, the code value "6" is generated again because the upper face of the contact 132a is substantially parallel with the board.

Defective (lift-off) in FIG. 7 is a state in which the contact 132a of the mounted component 132 has not adapted to the solder 133 and is lifted. In this case, the upper face of the solder 133 is convex. Therefore, the upper face of the solder 133, that is, the angle of the reflection plane, the height of the solder, and the like are different form those in the non-defective state. The form data 146b for the non-defective state and that for the defective (lift-off) state are different from each other. For example, in the defective (lift-off) state illustrated in the figure, the codes in the form data 146b are, for example, "0223334445666666DD." That is, in correspondence with the upper face of the solder 133 being convex, the code values are given in an increasing sequence. Also, the code values are given in such a sequence that the code "D" (reflection to the right side in the figure) corresponding to the position of the contact 132a appears next to the code value "6." When the non-defective state and the defective (lift-off) state are compared with each other, as mentioned above, the differences corresponding to the form of the upper face of the solder are revealed in code values and the state of succession thereof. Consequently, parameters identifying the form of the upper face of the solder can be defined by parameters representing the code values' tendency to increase or decrease.

In defective (insufficient solder) in FIG. 7, a sufficient quantity of solder 133 does not exist around the contact 132a of the mounted component 132, and the length and the like of the solder 133 are different from those in the non-defective state. The form data 146b acquired at points A to C in the defective (insufficient solder) state is different from that in the non-defective state. The code values in the form data 146b in the defective (insufficient solder) state, illustrated in the figure, are, for example, "66666666666532066." That is, in correspondence with almost no solder 133 being present, a large number of code values of "6" are given in succession. In correspondence with a slight quantity of the solder 133, such a decreasing sequence as "5320" is slightly present. When the non-defective state and the defective (insufficient solder) state are compared with each other, the differences corresponding to the form of the upper face of the solder are revealed in code values and the state of succession thereof again. Consequently, parameters identifying the form of the solder can be defined by the following in the form data 146*b*: a numerical value wherein the code value "6" is given in succession, a numerical value wherein a code value other than "6" is given in succession, and parameters representing their tendency to increase or decrease.

In the defective (component missing) in FIG. 7, there is no mounted component 132 on the solder 133. Thus, the upper face of the solder 133, that is, the angle of the reflection plane and reflection from the mounted component fixing point are different from those in the non-defective state. The form data 146*b* acquired at points A to C in the defective (component missing) state is different from that in the non-defective state. The code values in the form data 146*b* in the defective (component missing) state, as illustrated in the figure, are such a sequence as "022333444566666DC," for example. That is, in correspondence with the upper face of the solder 133 being convex, the code values are given in an increasing sequence. Also, the code values are given in such a sequence that the code values "D" and "C" corresponding to the convex face of the solder appear next to code value "6." When the non-defective state and the defective (component missing) state are compared with each other, as mentioned above, the differences corresponding to the form of the upper face of the solder are revealed in code values and the state of succession thereof. Consequently, parameters identifying the form of the upper face of the solder can be defined by the following: parameters representing the code values' tendency to increase or decrease, the presence/absence of code value fluctuation in the mounted component position, and the like.

Figure 8:
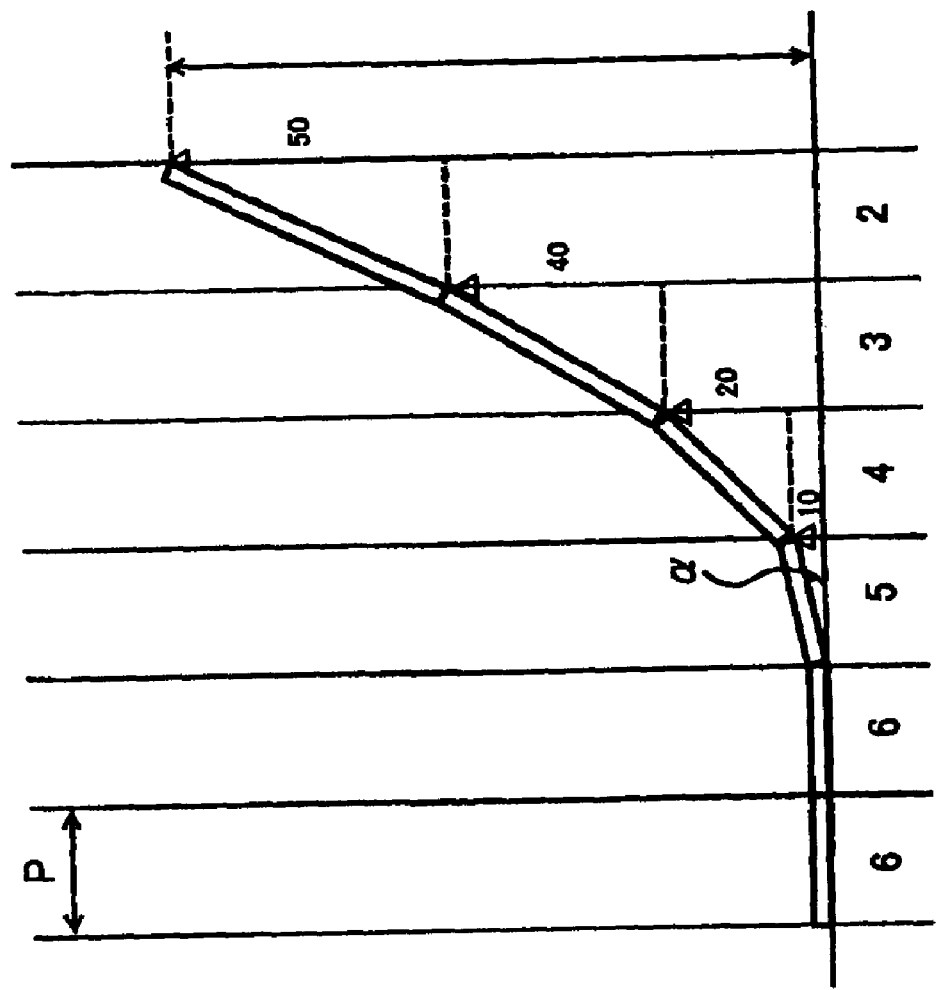
FIG. 8 is an explanatory drawing explaining an example of parameters.

FIG. 8 is an explanatory drawing explaining an example of some of these parameters, and relates to a case where the height of solder is identified as form. As mentioned above, the codes in the form data 146*b* correspond to the positions in which reflected light arrives at the individual sensors illustrated in FIG. 5. The positions of arrival correspond to the reflection angles of irradiated laser light. The reflection angle is considered to correspond to the orientation angle of a solder face. Consequently, the height of the solder with each data acquiring pitch P can be found by taking into account data acquiring pitch P during sweeping and the orientation angle of the reflection plane. More specifically, when the code in the form data 146*b* is "6," as illustrated in FIG. 8, the optical path is considered to be substantially perpendicular to the board plane. Therefore, the reflection plane is considered to be substantially parallel with the board. When the code is "5," the orientation angle of the reflection plane to the board is considered to be $\alpha$ from the direction of the reflection.

If the orientation angle $\alpha$ is known, the height of the solder with the above pitch P is revealed. In the example in FIG. 8, the height for orientation angle $\alpha$ is 10. Similarly, the height of the solder can be figured for codes "4" to "2." When the height of the solder with each pitch known from each code is integrated, the obtained value corresponds to the height of the solder in the form data 146*b*. Consequently, in the example illustrated in FIG. 8, the form data 146*b* of "665432" is converted into "0+0+10+20+40+50," and "120" is taken as the height of the solder. This is an example of parameters which allows form to be identified. FIG. 8 is a simplified drawing. Actually, sweep data is acquired by a larger number of runs of sweeping than illustrated in the figure. The number of sequences of numerical values in the form data 146*b* is larger than illustrated in the figure.

The number of parameters in this embodiment is, for example, 200, as mentioned above. The parameters can be computed by substituting the form data 146*b* into various conversion expressions. For example, in case of defective (insufficient solder) illustrated in FIG. 7, the smaller the amount of the solder is, the larger the number of code values of "6" is. Therefore, by computing (number of code values of "6")/(total number of code values), parameters characterizing the flatness of a solder position can be computed. If there is any other uneven area in the upper face of solder, the code value does not monotonically vary but repeatedly increases and decreases, like "456545432." In this case as well, parameters characterizing the unevenness in the upper face of the solder can be computed. This is done by taking measurements when the numerical value is increased in two successive sequences of numbers and when the numerical value is decreased, and computing (number of increases−number of decreases).

As mentioned above, the parameter computing portion 166*a* computes a plurality of parameters which characterize a form identified from the form data 146*b* according to predetermined conversion expressions. A variety of components are mounted on a board, and the form of solder may differ in some types of components. In this case, an expression for computing parameters based on the form data 146*b* is changed. Needless to say, pass/fail judgment is made with respect to each component type. The parameter computing portion 166*a* acquires expressions for computing parameters for each component as product data and performs computation. Alternatively, a program may be written according to such an algorithm that computation is performed by specific expressions, and parameters may be computed by executing the program.

The threshold determining portion 166*b* acquires discriminant function data and threshold data (to be described later) from the multivariate statistics analyzer 400 through the communication I/O 144. Then, the threshold determining portion 166*b* carries out pass/fail judgment by threshold. The discriminant function data is a function which takes as variables some of parameters computed by the parameter computing portion 166*a*. The threshold determining portion 166*b* substitutes the computed parameters into the discriminant functions to compute a value for judgment. Then, the threshold determining portion 166*b* compares the value for judgment with the threshold. If the value for judgment is on the pass category side with the threshold taken as the boundary, a pass judgment is given. If the value for judgment is on the fail category side with the threshold taken as the boundary, a fail judgment is given.

The threshold determining portion 166*b* outputs the result of the pass/fail judgment to the display unit 142. Thus, the result of the pass/fail judgment is indicated on the display unit equipped on the laser inspecting instrument 100. Further, the result of the pass/fail judgment is outputted as pass/fail judgment result data through the communication I/O 144, and accumulated in the data accumulation device 200 to be described later. As mentioned above, the laser inspecting instrument 100 can acquire data from the data accumulation device 200 or the multivariate statistics analyzer 400 as required. Then, the laser inspecting instrument 100 makes it possible to judge the acceptability of the state of mounting based on solder form with respect to the individual contacts of the individual components mounted on a board.

(3) Constitution of Data Accumulation Device

Figure 9:
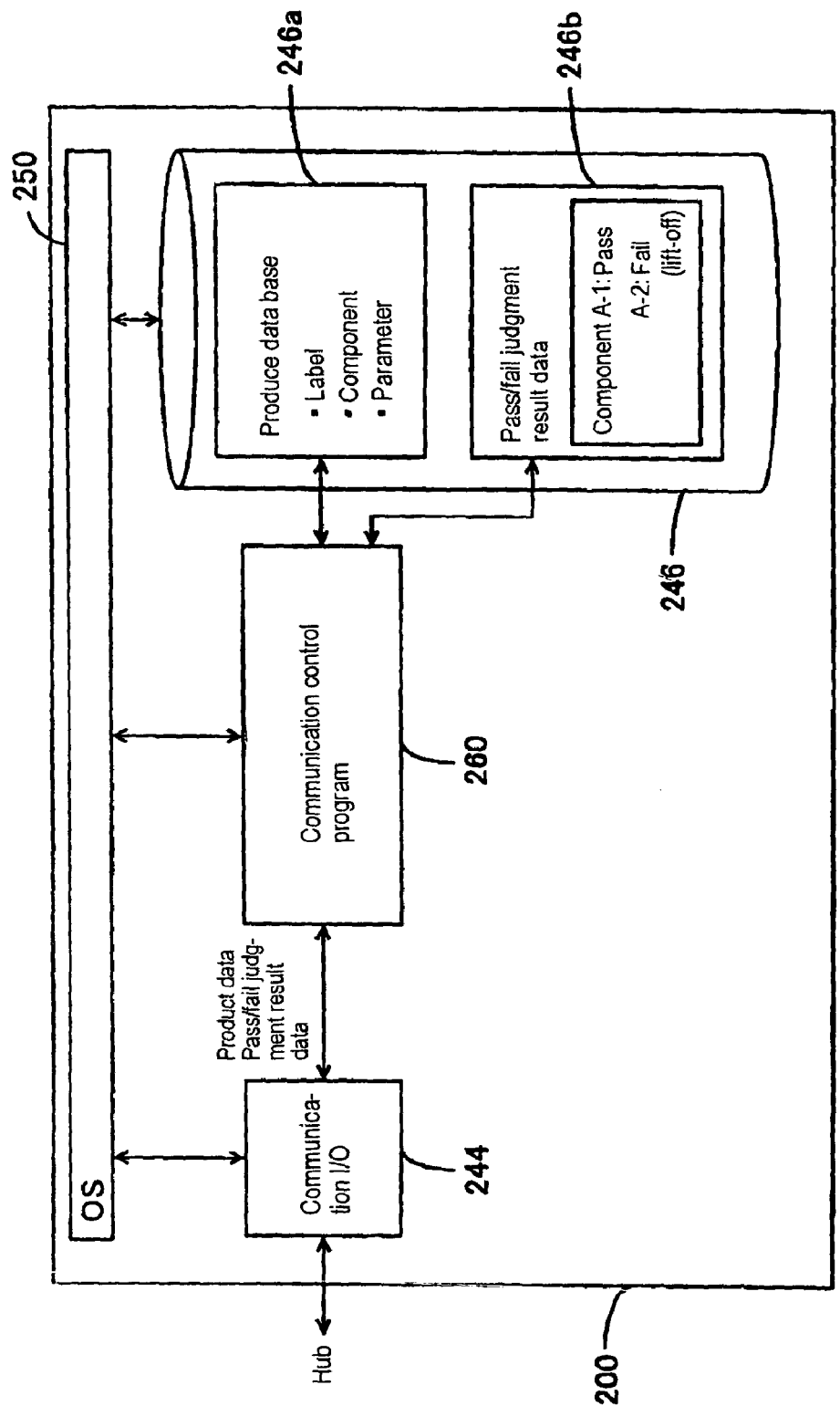
FIG. 9 is a functional block diagram of a communication control program.

FIG. 9 is a functional block diagram of the communication control program executed at the data accumulation device 200. At the data accumulation device 200, the communication control program 260 is executed under the control of OS 250. The OS 250 controls data transmission and reception through the communication I/O 244 and reading of files from the storage unit 246. Further, the OS 250 supplies required data to the communication control program 260. In FIG. 9, the direction of data communication at the communication I/O 244, the communication control program 260, and the storage unit 246 is indicated by an arrow for the purpose of clarifying the relation in data communication.

The communication control program 260 is a program for transmitting and receiving data through the communication I/O 244. The communication control program 260 outputs product data and pass/fail judgment result data in response to external requests. The storage unit 246 is a hard disk drive for holding the product database 246a and pass/fail judgment result data 246b. The product database 246a is constructed and pass/fail judgment result data 246b is accumulated before the operation of the system of the present invention is initiated. However, the database and data can be updated with the operation of the system. Pass/fail judgment result data outputted from the threshold determining portion 166b can be acquired and additionally recorded. Or, visual judgment data outputted from the visual judgment result input device 300 to be described later can be added as new pass/fail judgment result data.

Figure 10:
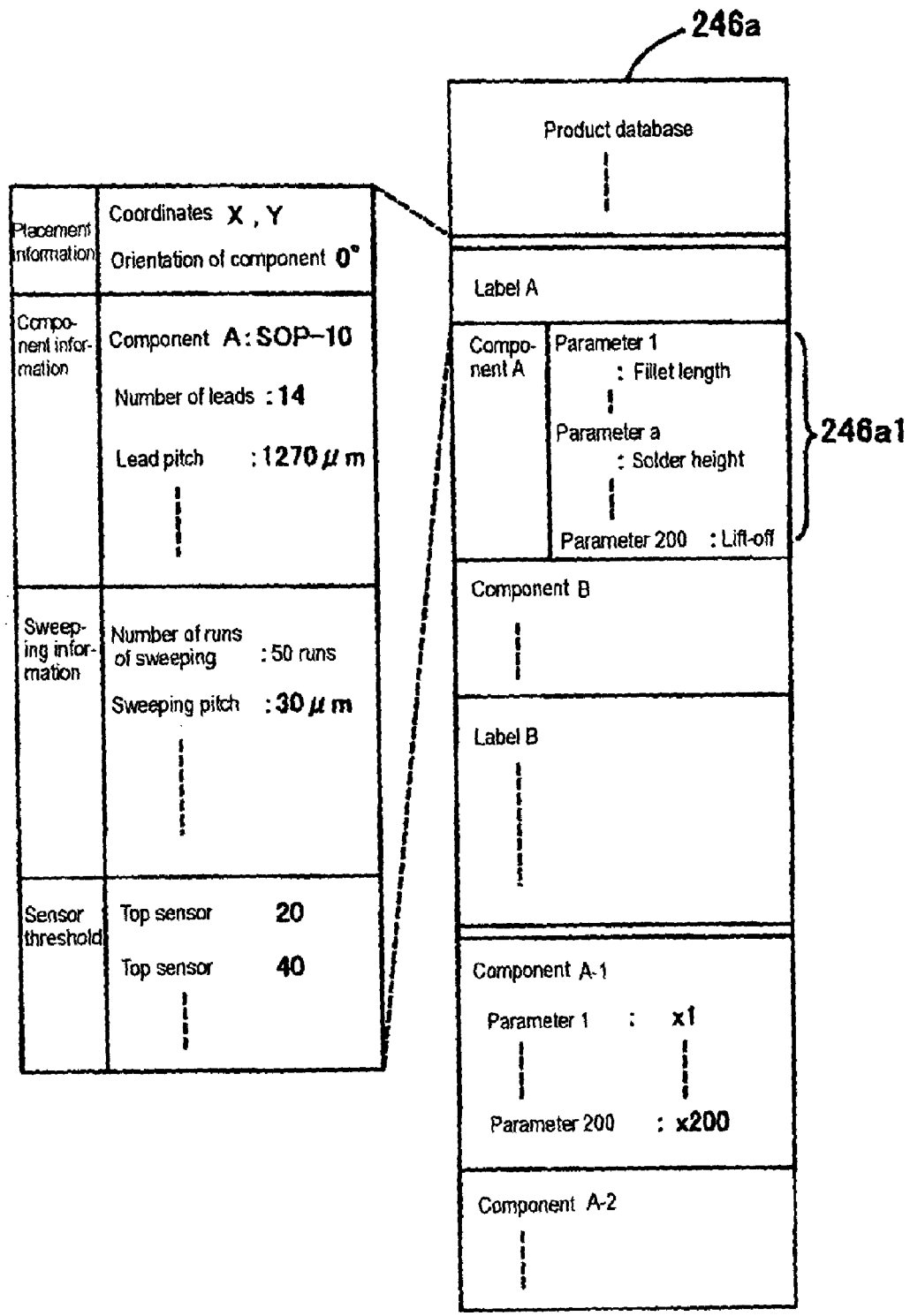
FIG. 10 is a drawing illustrating an example of product data accumulated in a product database.

FIG. 10 illustrates an example of product data accumulated in the product database 246a. The product data contains data which identifies the components on the individual boards and the positions of the contacts of the individual components by label stuck to the boards. The product data also contains parameters actually computed with respect to each component. The former is used for identifying the positions of pass/fail judgment objects irradiated with laser light at the laser inspecting instrument 100 and for like purposes. The latter is actual parameter values obtained when pass/fail judgment is made on the individual components, and recorded in correspondence with pass/fail judgment result data to be described later.

Figure 11:
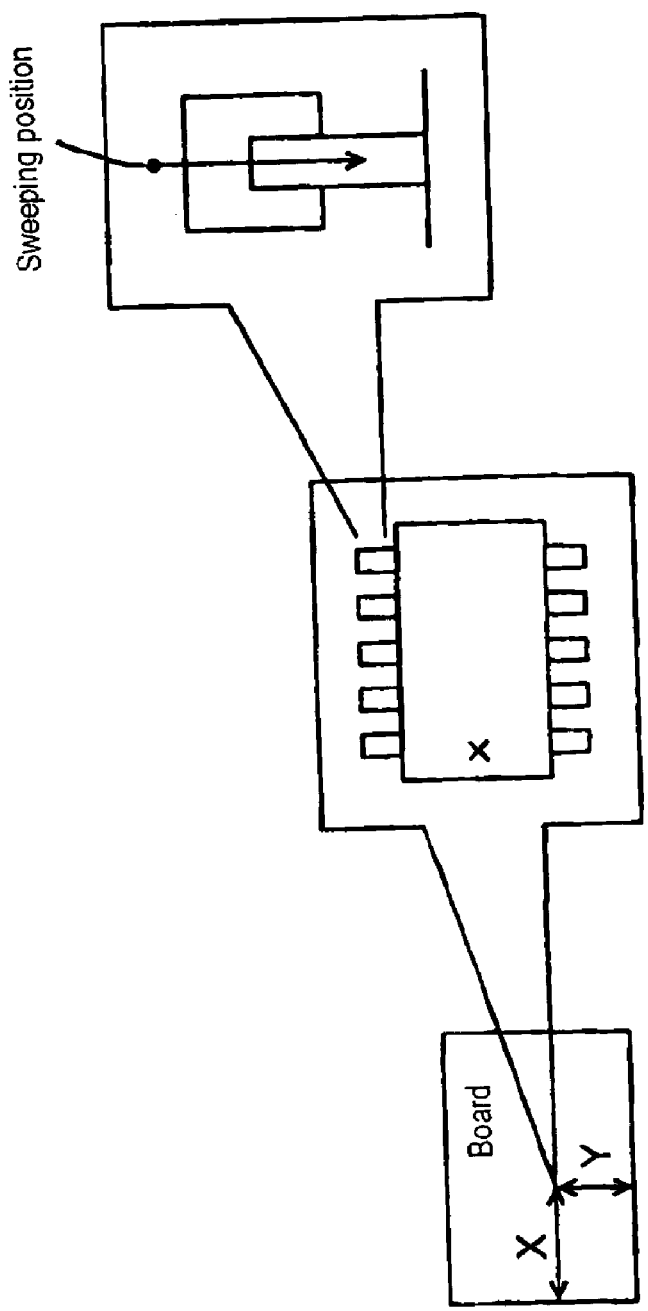
FIG. 11 is a drawing illustrating the position of laser irradiation.

Data corresponding to each label includes data listed on the left side in FIG. 10, and parameter computing expressions for each component. The data shown on the left side in FIG. 10 contains the coordinates (X, Y) of the components on the boards, the orientation of the components, and the like as placement information. It contains the types of components, the numbers of leads (contacts), lead pitches, and the like as component information. The laser irradiation positions are thereby identified. FIG. 11 illustrates how a laser irradiation position is identified. As illustrated on the left side in the figure, the coordinates of a component are coordinates for identifying a point on a board. As illustrated in the middle part of the figure, it is predetermined that the coordinates correspond to a certain position ("x" mark in FIG. 11) of the component.

Further, in what direction a component is mounted on a board is identified from "orientation of component" in placement information. The position of each lead is identified by the number of leads and the pitch of the leads. The above-mentioned sweeping is performed from the front side toward the body of the component, and, if the position of the lead is identified, the sweeping start position is identified. Therefore, the laser inspecting instrument 100 can identify the start position of sweeping from these pieces of product data. Thus, the laser inspecting instrument 100 controls the X-Y stage 130 so that the identified start position can be irradiated with laser.

Product data further contains sweeping information and sensor thresholds. The sweeping information contains the numbers of runs of sweeping and sweeping pitches. The sensor thresholds are thresholds for identifying whether laser light is accepted or not at the individual sensors. Therefore, the laser inspecting instrument 100 can identify a sweeping technique by these pieces of product data, and controls the galvanometer 124 and the code generation unit 122 to acquire sweep and code data.

In the product database 246a, parameter computing expressions 246a1 are recorded on a component-by-component basis. The forms of contacts may differ from one component to another. In this case, the form of solder inferred from the form data 146b is also different. Therefore, parameter computing expressions are defined and recorded on a component-by-component basis. In FIG. 10, parameters actually computed with respect to each component are indicated as component A-1, A-2, ..., which makes it possible to identify each component. Further, calculated values (x1 to x200 in FIG. 10) for each parameter are also recorded.

In the stage of beginning of operation, a plurality of pieces of data are recorded as actually computed parameters. Parameters may be additionally recorded with respect to all or some of the pass/fail judgment objects. In case of this embodiment, to additionally record data, parameter values computed by the parameter computing portion 166a are acquired through communication I/O 144. The parameters of each component are correlated with the pass/fail judgment result data 246b. The pass/fail judgment result data 246b is a record of pass/fail judgment results ("non-defective," "defective (lift-off)," etc.). That is, it can be judged from correlation between the parameter values and the pass/fail judgment result data 246b whether the judgment result is "pass" or "fail (defective)" with each parameter given.

The pass/fail judgment result data 246b is utilized when the acceptability of pass/fail judgment objects (contacts) is categorized. More specifically, when the individual parameters are substituted into discriminant functions at the laser inspecting instrument 100, some value is computed in the dimension of the discriminant functions. With respect to the value, a histogram is plotted in correspondence with pass/fail judgment results. Thus, the distribution of pass judgment and the distribution of fail judgment are obtained for variable Z. These distributions are defined as pass category and fail category. There are various causes, such as lift-off, insufficient solder, and component missing, in fail category, as described above. Therefore, fail category may be subcategorized on a cause-by-cause basis.

As described above, pass/fail judgment can be made by accumulating appropriate data in the data accumulation device 200 and providing the data in such a manner that the data can be referenced at the laser inspecting instrument 100. With respect to a new label, product data, data on the mounted components concerned, and the like can be added in the data accumulation device 200. Thus, pass/fail judgment can be made on boards and components whose data is not accumulated in the stage of beginning of operation.

(4) Constitution of Visual Judgment Result Input Device

Figure 12:
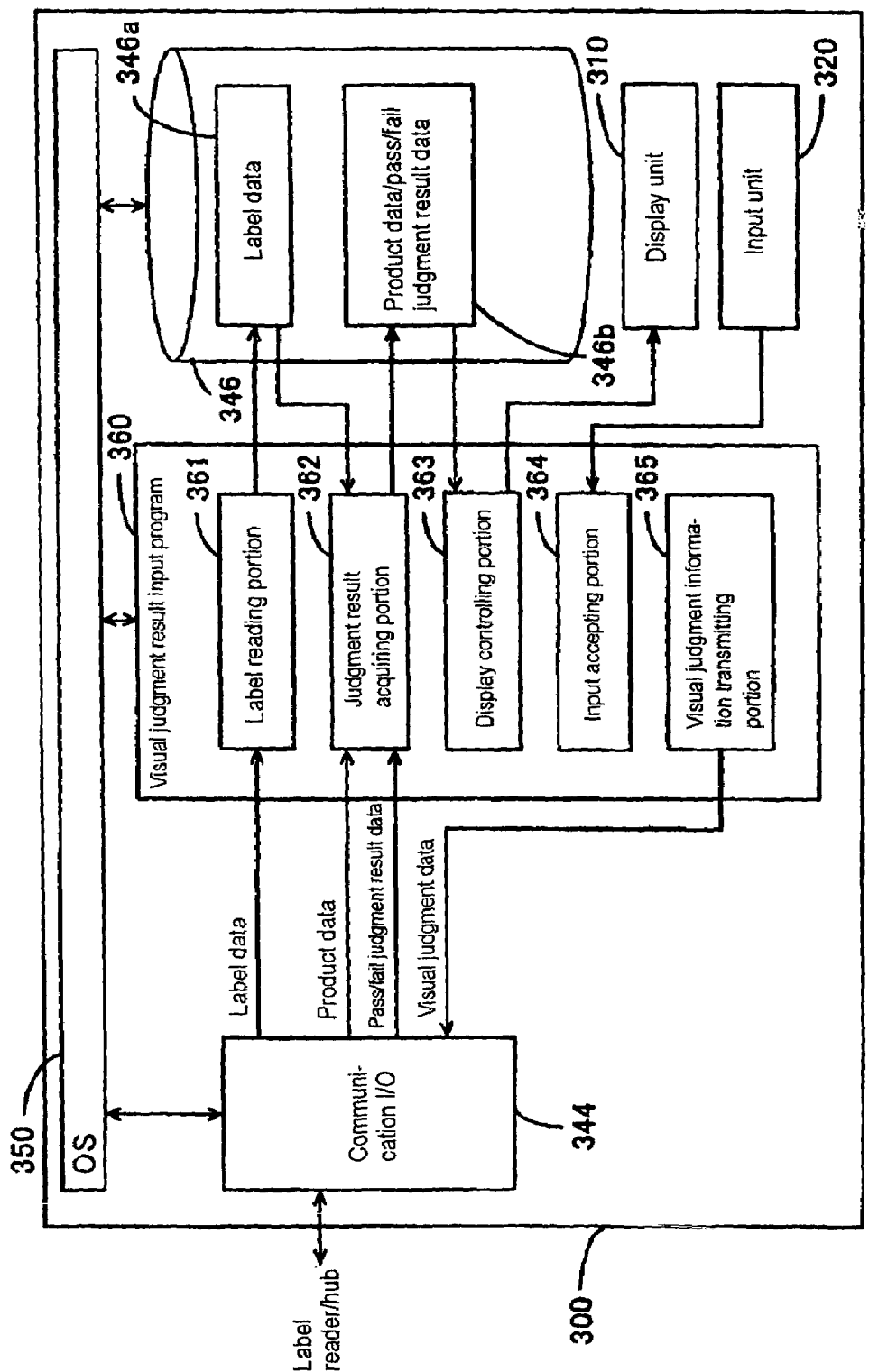
FIG. 12 is a functional block diagram of a visual judgment result input program.

FIG. 12 is a functional block diagram of the visual judgment result input program executed at the visual judgment result input device 300. At the visual judgment result input device 300, the visual judgment result input program 360 is executed under the control of OS 350. The OS 350 controls data transmission and reception through the communication I/O 344 and reading of files from the storage unit 346. The OS 350 supplies required data to the visual judgment result input program 360. In FIG. 12, the direction of data communication at the communication I/O 344, the visual judgment result input program 360, and the storage unit 346 is indicated by an arrow for the purpose of clarifying the relation in data communication.

The visual judgment result input program 360 comprises a label reading portion 361, a judgment result acquiring portion 362, a display controlling portion 363, an input accepting portion 364, and a visual judgment information transmitting portion 365. The label reading portion 361 controls a label reader (not shown) through the communication I/O 344 to acquire label data for identifying the labels on boards, and stores the data in the storage unit 346 (label data 346a). Here, reading operation has to be only performed on boards including pass/fail judgment objects judged as failed, not on all boards.

Figure 13:
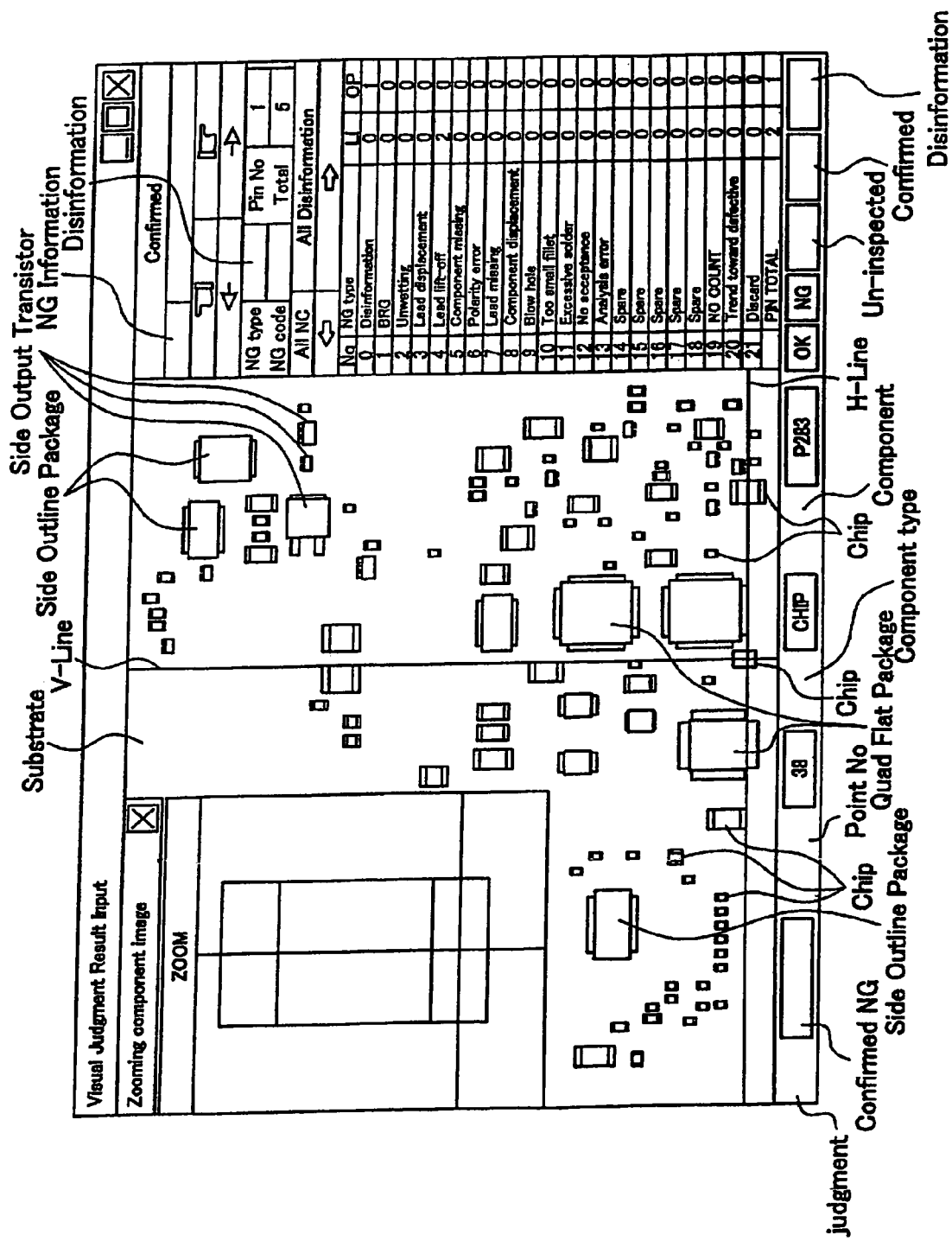
FIG. 13 is a drawing illustrating an example of the display image of a board surface.

The judgment result acquiring portion 362 acquires data from the data accumulation device 200 through the communication I/O 344. The data is product data about a board corresponding to a label which underwent the reading operation and pass/fail judgment result data thereof. Then, the judgment result acquiring portion 362 stores the acquired data in the storage unit 346. The display controlling portion 363 refers to the product data and pass/fail judgment result data stored in the storage unit 346. Then, the display controlling portion 363 generates image data of the board surface, and outputs the data to the display unit 310. Thus, the image is shown on the display. FIG. 13 illustrates an example of the display image.

As illustrated in the figure, the display image schematically shows the components mounted on the board and the contacts thereof. With the display image on the screen, input can be accepted under the control of the input accepting portion. This input is done from the input unit 320 comprising a keyboard and the like equipped on the visual judgment result input device 300. Various operations can be performed on the screen. For example, the enlarged view of each component can be displayed, as illustrated at the upper left of FIG. 13. In the example in FIG. 13, pass/fail judgment on each contact can be displayed together (for example, by indicating a fail judgment in red color). The user visually judges whether contacts judged as failed are truly failed.

Further, the user can input the result of this visual judgment by operating the input unit 320. When the input accepting portion 364 accepts the result of input, it passes the visual judgment result to the visual judgment information transmitting portion 365. The visual judgment information transmitting portion 365 outputs visual judgment data indicating the visual judgment result through the communication I/O 344. The visual judgment data is pass/fail judgment result data 246b additionally recorded in the data accumulation device 200. Needless to say, at this time, it may be visually judged whether a contact judged as passed is truly passed, and the result of the judgment may be transmitted to the data accumulation device 200. Visual judgment results and parameter information thereon are correlated with each other. Therefore, on what parameter a pass judgment or a fail judgment has been visually given can be grasped.

These pieces of visual judgment data are used for the enhancement of the accuracy of statistics at the multivariate statistics analyzer 400. As mentioned above, with the visual judgment result input device 300, the inputted result of visual judgment can be incorporated in pass/fail judgment of the present invention when analysis is carried out by the multivariate statistics analyzer 400. In the initial stage of operation, this incorporation of visual judgment results is not indispensable. (This is because pass/fail judgment can be made with accuracy even in the beginning of operation.) However, by correction based on visual judgment, the accuracy of statistics can be enhanced with ease, and a reliable and high-performance pass/fail judgment device can be provided.

Further, categories can be subdivided by input through the visual judgment result input device 300. There are a variety of possible causes for defective soldering, and solder form characteristic of causes for detectives differ from one cause to another. Therefore, judgment can be made with accuracy by defining different discriminant functions on a cause-by-cause basis. When input is done through the visual judgment result input device 300, the form of solder is visually checked. Therefore, it is easy to input a cause for defect corresponding to the solder form concerned.

Consequently, causes for defect can be inputted together through the visual judgment result input device 300, and data representing the inputted causes can be taken as pass/fail judgment result information. Thus, discriminant functions which isolates separate fail categories and pass categories on a cause-by-cause basis can be computed. Here, a cause for defect is visually checked and inputted, and the cause is not always exactly appropriate. However, if at least the apparent solder form differs, it is contemplated that the cause for defect differs as well. Therefore, causes can be subdivided into a separate cause by apparent differences. Cause-by-cause subcategorization to the extent that judgment can be visually and definitely made is good enough. For example, judgment can be made depending on whether the mounted component 132 is lifted off solder 133; whether the amount of solder is insufficient; or whether the component 132 is missing.

(5) Constitution of Multivariate Statistics Analyzer

Figure 14:
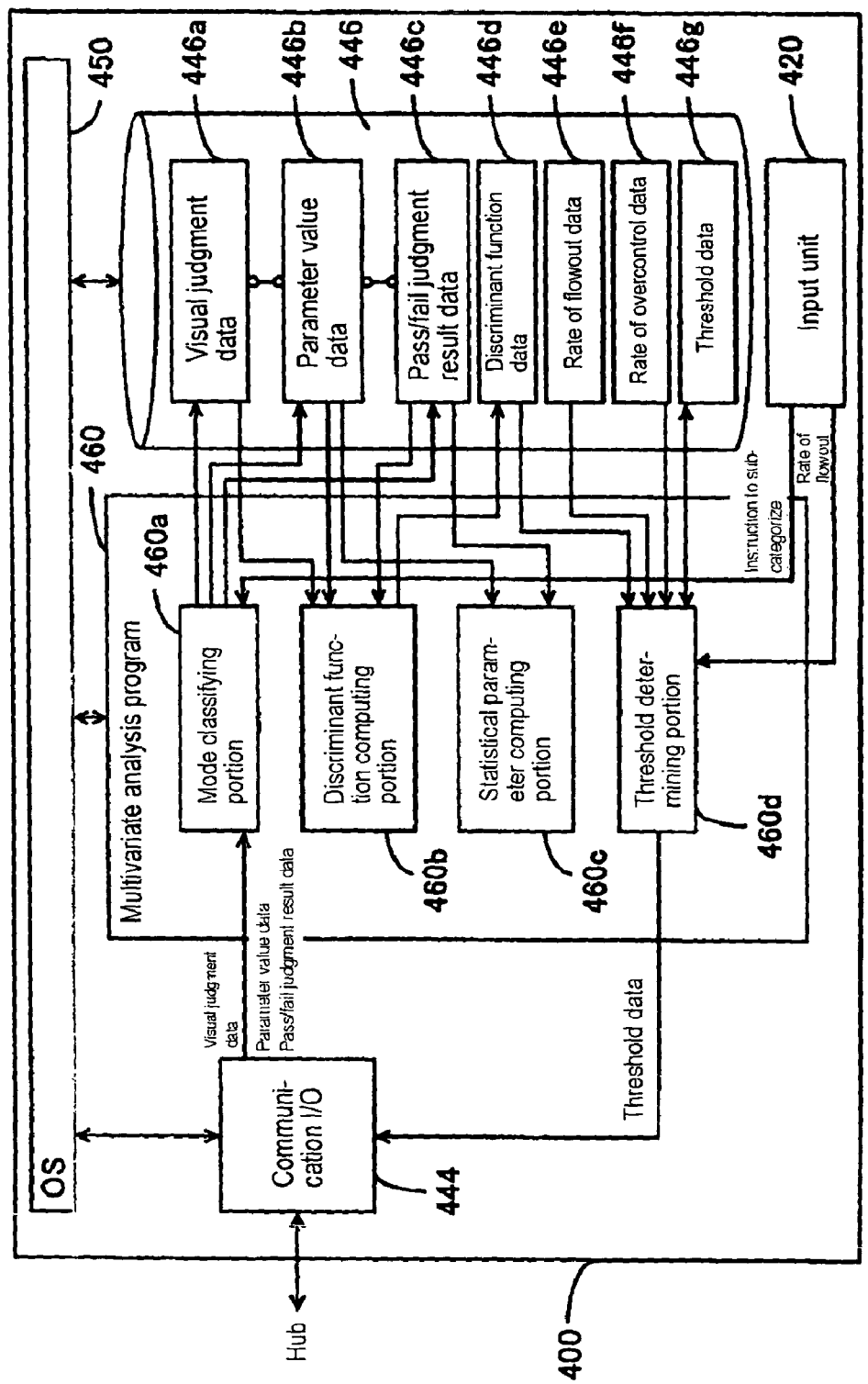
FIG. 14 is a functional block diagram of the multivariate analysis program.
Figure 15:
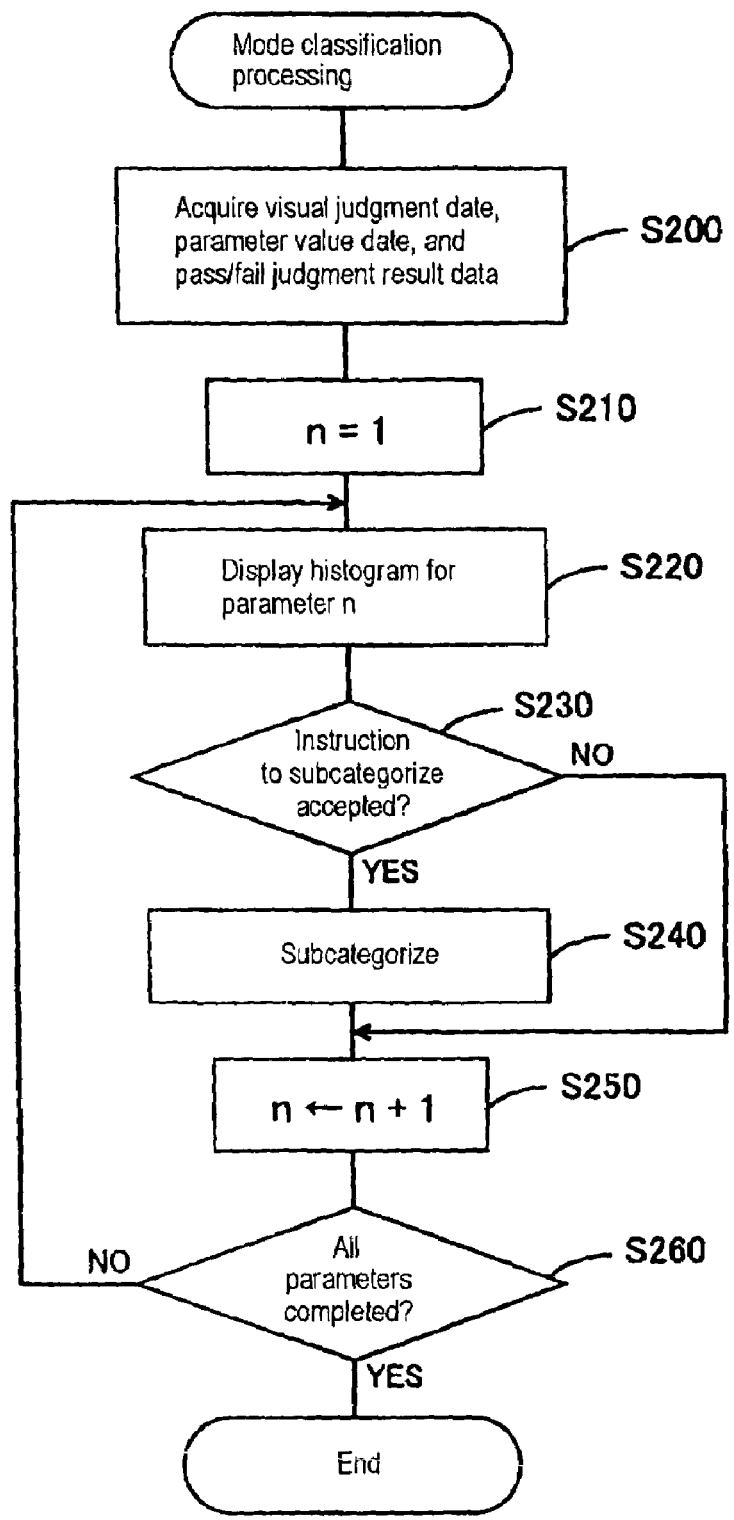
FIG. 15 is a flowchart of mode classification processing.
Figure 17:
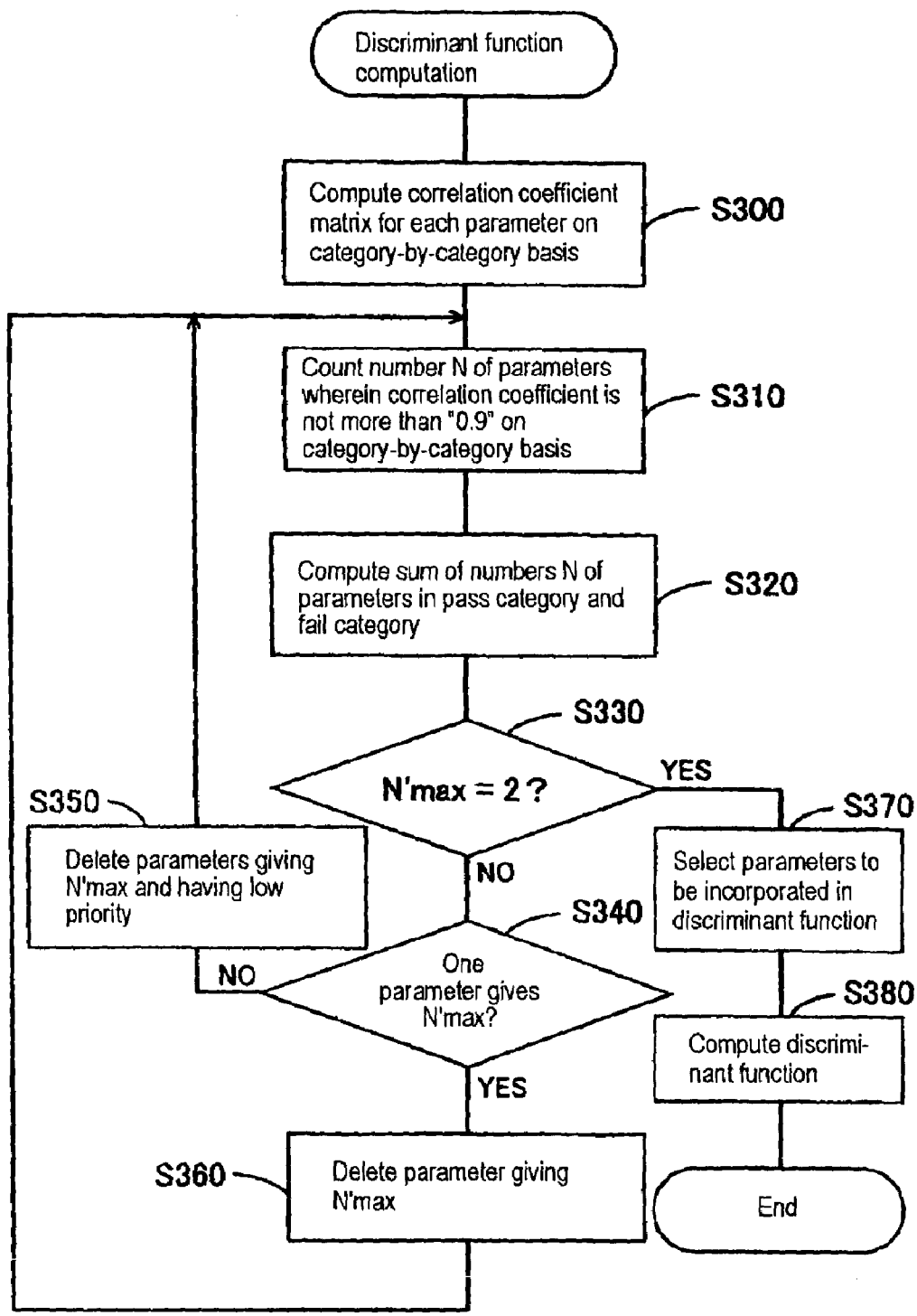
FIG. 17 is a flowchart of discriminant function computation.
Figure 19:
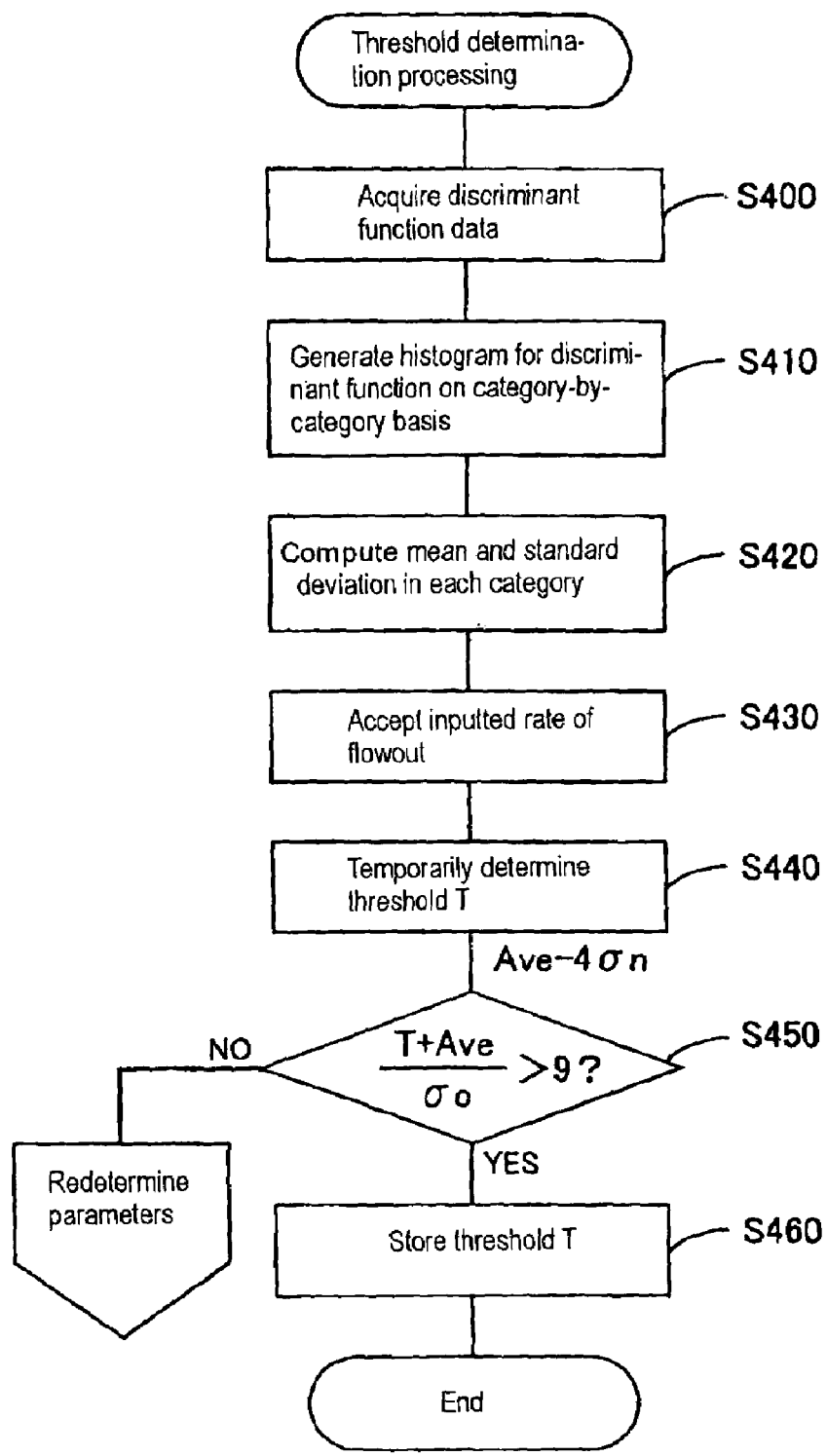
FIG. 19 is a flowchart of threshold determination processing.

According to this embodiment, such a threshold as not to give a rate of flowout or rate of overcontrol deviating from intention can be determined by conducting analysis at the multivariate statistics analyzer 400. A high-performance pass/fail judgment device is thereby implemented. The constitution of the multivariate statistics analyzer 400 and processing performed therein will be described below. FIG. 14 is a functional block diagram of the multivariate analysis program executed at the multivariate statistics analyzer 400. FIGS. 15, 17, and 19 are flowcharts illustrating processing performed by each module of the multivariate statistics analysis program.

At the multivariate statistics analyzer 400 illustrated in FIG. 14, the multivariate analysis program 460 is executed under the control of OS 450. The OS 450 controls data transmission and reception through the communication I/O 444, and reading of files from the storage unit 446 (e.g. hard disk drive). Further, the OS 450 supplies required data to the multivariate analysis program 460. In FIG. 14, the direction of data communication at the communication I/O 444, the multivariate analysis program 460, and the storage unit 446 is indicated by an arrow for the purpose of clarifying the relation in data communication.

A mode classifying portion 460a subdivides categories. The mode classifying portion 460a acquires data through the communication I/O 444 at Step 200, as illustrated in FIG. 15. The acquired data includes visual judgment data recorded in the visual judgment result input device 300, and parameter value data and pass/fail judgment result data recorded in the data accumulation device 200. The parameter value data is parameter values actually computed with respect to each component. These pieces of acquired data are stored in the storage unit 446 (visual judgment data 446a, parameter value data 446b, pass/fail judgment result data 446c), and used by each module of the multivariate analysis program 460. Each piece of parameter value data 446b is correlated with pass/fail judgment result data 446c (or visual judgment data 446a) therefor. Thus, the result of pass/fail judgment can be grasped with each parameter given.

At Step 210, a counter n for the number of parameters (1 to 200 in this embodiment) is initialized (n=1). At Step 220, the histograms of pass category and fail category are generated for parameter n, and shown on the display equipped on the multivariate statistics analyzer 400. Here, pass or fail for each parameter value depends on the pass/fail judgment result data 446c. However, for those which underwent visual judgment at visual judgment result input device 300, pass and fail are categorized according to the results of visual judgment. That is, for objects which underwent visual judgment, the results of visual pass/fail judgment are correlated with parameter value data. Histograms are generated and displayed according to this correlation. As a result, for objects which are visually judged as failed and whose parameter is placed in pass category at the laser inspecting instrument 100, it can be clearly demonstrated that the objects fall in fail category.

Figure 16:
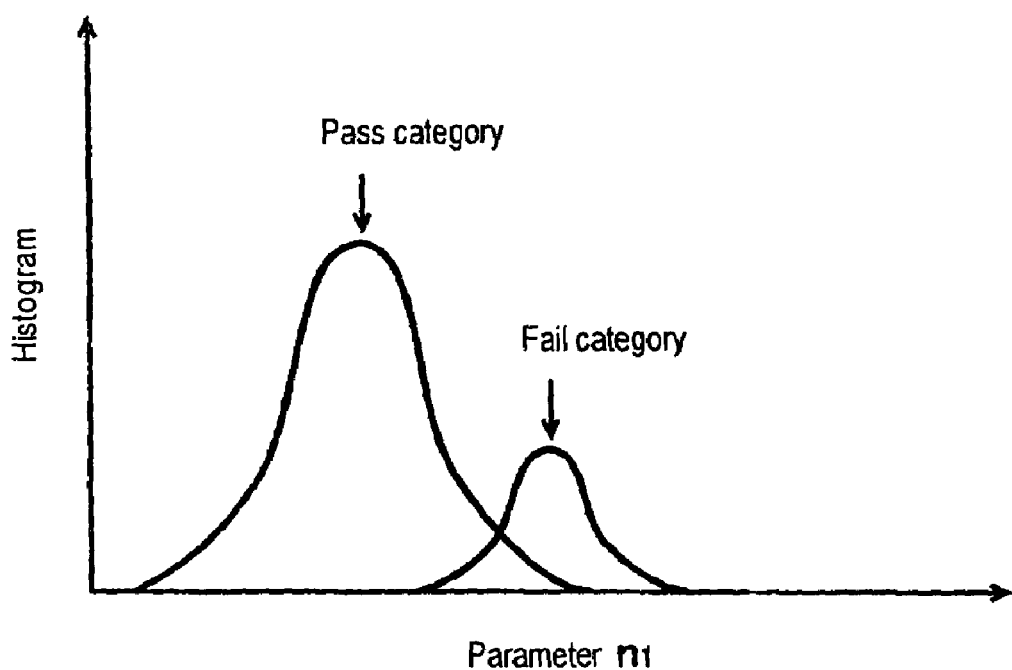
FIG. 16 is a drawing illustrating an example of histograms.
Figure 16:
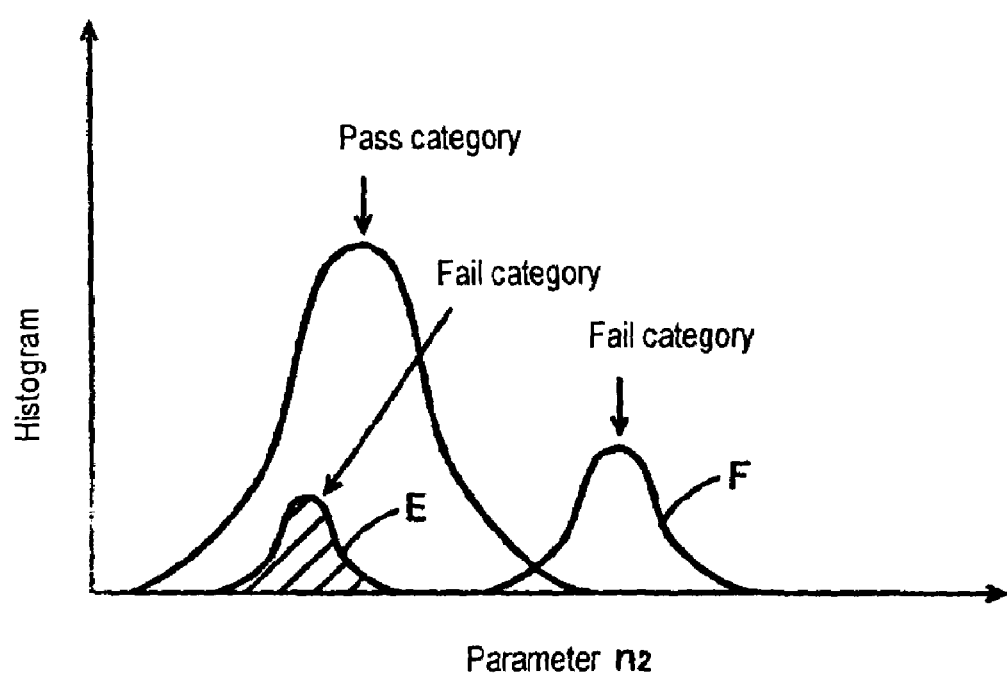

FIG. 16 is an example of displayed histograms, and the upper part of the figure illustrates an example with respect to parameter n1. In this example, the histogram forms substantially normal distribution for pass category and for fail category, and is divided into two distributions. The lower part of the figure illustrates an example with respect to parameter n2. In this example, the histogram forms substantially normal distribution for pass category and for fail category, and is divided into three distributions. In the histogram with respect to parameter n2, the fail category is divided into two distributions, distribution E and distribution F. Distribution E is contained in pass category at the laser inspecting instrument 100, but distribution F is separated from that pass category.

Under this situation, it can be said that the form characterized by parameter n2 is a form characteristic to a cause of defect in distribution F. However, it cannot be said that the form is a form characteristic to a cause of defect in distribution E. If the form characterized by parameter n2 were a form characteristic to a cause of defect in distribution E, the distribution E should be separated from pass category in FIG. 16. Therefore, the cause of defect is different in distribution E and in distribution F. Further, parameter n2 is a favorable parameter in a discriminant function which separates distribution F and pass category, but not in a discriminant function which separates distribution E and pass category. Consequently, as for distribution E and distribution F, fail category is subcategorized to make pass/fail judgment by different discriminant functions.

With a histogram shown on the display on a parameter-by-parameter basis, as illustrated in FIG. 16, it can be grasped whether a category should be subcategorized. The user can provide an instruction to do it at the multivariate statistics analyzer 400. For this purpose, the multivariate statistics analyzer 400 comprises an input unit 420 composed of an operating and input device, such as a keyboard. At Step 230, it is judged whether an instruction to subdivide a category is accepted through the input unit 420. If an instruction to subdivide a category is accepted at Step 230, the category is subdivided at Step 240. If this subcategorization is carried out, a discriminant function which separates the frequency distributions of the subdivided fail category and pass category is obtained by discriminant function computation to be described later.

In the example illustrated in FIG. 16, at this time, parameter n2 is not included in the discriminant function which separates distribution E and pass category. Parameter n2 is included in the discriminant function which separates distribution F and pass category. In a concrete example illustrated in FIG. 7, defective (lift-off), defective (insufficient solder), and defective (component missing) can be respectively evaluated by different discriminant functions. For defective (lift-off), a discriminant function containing a parameter which indicates the code value's tendency to increase or decrease can be obtained. For defective (insufficient solder), a discriminant function containing a parameter which indicates the code value's tendency to increase or decrease and a parameter which indicates a succession of the code value of "6" can be obtained. For defective (component missing), a discriminant function containing a parameter which indicates the code value's tendency to increase or decrease and a parameter which indicates the presence/absence of code value fluctuation in a mounted component position can be obtained.

By the above-mentioned processing, a discriminant function which positively separates pass category and fail category can be defined. Thus, pass/fail judgment can be made with accuracy. At Step 250, the counter n is incremented, and Step 220 and the following processing steps are repeated until subcategorization is judged at Step 260 to have been completed for all the parameters. If a visual judgment result is erroneously inputted at the visual judgment result input device 300, abnormal data can be found in such a histogram as illustrated in FIG. 16. (For example, defectives are found in pass category or non-defectives are found in fail category.) In this case, visual judgment data 446a which gives the abnormal data can be deleted or disused.

In this embodiment, a histogram is actually displayed, and the user inputs an instruction to subdivide a category. Needless to say, this operation may be automatically performed by statistics analysis. More specifically, it is judged whether there are a plurality of peaks in the distribution of fail category. If there are two or more peaks, parameter values which gives the individual peaks are subjected to fitting by normal distribution. Then, it judged by σ of the fitted distribution function whether both the distributions are away from each other by a specified distance or more. If the distributions are away from each other by the specified distance or more, subcategorization at Step 240 is performed. That is, if there are a plurality of peaks in the distribution of fail category, there is a possibility that the distributions of fail category are separated from each other. Consequently, processing is performed to evaluate the distance between the distributions. When the distance between the distributions is evaluated, it may be evaluated by σ of the individual distributions, as mentioned above. Or, it may be evaluated whether mean values or modes are away from each other by a specified distance or more.

Up to this point, an embodiment in which categories are subdivided by mode classification processing has been described. However, pass/fail judgment can be made if a category is subdivided when a visual judgment result is inputted at the visual judgment result input device 300 for either pass category or fail category. In this case as well, an appropriate parameter is selected for each discriminant function on the same principle as illustrated in FIG. 16. Pass category and fail category are appropriately separated on a cause-by-cause basis, and thus pass/fail judgment can be made. Needless to say, subcategorization by input of visual judgment results and subcategorization according to an instruction described at Step 230 may be used together.

The discriminant function computing portion 460b is a function which gives some variable. When the frequency distributions of pass category and fail category are produced with respect to that variable, processing is performed to compute a discriminant function which positively separates the distributions. This variable is a function of a plurality of the above-mentioned parameters. In this embodiment, there are parameter 1 to parameter 200. In this embodiment, when the distributions are separated, an effective variable is selected, and discriminant functions are defined by a specified number of parameters. When a specified number of the parameters are selected, multicolinearity is eliminated based on the following correlation coefficient and the levels of importance of the parameters.

There may be certain correlation between two parameters. (Such correlation include, for example, a case where the value of one parameter tends to increase as the value of the other parameter increases.) The correlation coefficient in this embodiment is a value obtained by quantifying the strength of correlation in such a case, and is calculated by Expression (1) below.

[Expression 1]
$$r_{ij} = \frac{S_{ij}}{\sqrt{S_i S_j}}$$

$$S_i = \sum_{k=1}^{n} (x_{ik} - \overline{x_i})^2$$

$$S_j = \sum_{k=1}^{n} (x_{jk} - \overline{x_j})^2$$

$$S_{ij} = \sum_{k=1}^{n} (x_{ik} - \overline{x_i})(x_{jk} - \overline{x_j})$$

where, i and j are respectively the number of a parameter, and take a value of 1 to 200 in this embodiment. $x_{ik}$ represents the kth value of parameter #i, and n is the number of samples of parameter value data 446b and pass/fail judgment result data 246b. The bars above the characters indicate average.

The correlation coefficient defined above takes a value of −1 to 1, and the correlation is stronger as the absolute value thereof approaches 1. If two or more different variables strongly correlated are incorporated, a discriminant function which enables accurate pass/fail judgment is not obtained. Consequently, in this embodiment, parameters are deleted in decreasing order of the number of correlation coefficients not less than 0.9. More specifically, a series of processing at Steps 300 to S360 in FIG. 17 is performed. At Step 300, the acceptability is grasped based on the pass/fail judgment result data 446c, and computation is performed by Expression (1) based on each piece of parameter value data 446b. A correlation coefficient is computed for pass category and for fail category, and a correlation coefficient matrix is created. If categories are subdivided, a correlation coefficient matrix is created for each subcategory.

At the upper part of FIG. 18, a correlation coefficient matrix of pass category is illustrated. As illustrated in the figure, each element in the correlation coefficient matrix is specified by number ij. According to the definitional equations in Expression (1), the diagonal component is "1." At Step 310, the number N of parameters which give a correlation coefficient not less than "0.9" is counted. The middle and lower parts of FIG. 18 illustrate how the number N of parameters which give a correlation coefficient not less than "0.9" is counted in pass category and in fail category.

In the figure, 8 is taken as the total number of the parameters for the purpose of simplification. In reality, however, a larger number of parameters are processed in the same manner. In the figure, one square of the lattice corresponds to one component in the correlation coefficient matrix. For example, the correlation coefficient r12 in pass category corresponds to the square in the second line from the left and in the first line from the top, of the lattice at the middle part of the figure. (Here, it is assumed that r12 is less than 0.9.) In the figure, the parameters which give a correlation coefficient not less than "0.9" are indicated by a circle. The number N of parameters which give a correlation coefficient not less than "0.9" is equal to a value obtained by counting the number of circles and the number of 1 in the vertical direction. In the figure, the number is indicated as pass total N for pass category and as fail total N for fail category.

In the embodiment, parameters which give many correlation coefficients not less than "0.9" are deleted. Nevertheless, it is required to compute a discriminant function which positively separates pass category and fail category by discriminant analysis. There is no point in defining discriminant functions with different parameters in pass category and in fail category. Consequently, at Step 320, the respective numbers of parameters in pass category and fail category, that is, pass total N and fail total N, are added up to obtain a new value N', and parameters which give the maximum value N'max are deleted.

At Step 330, it is judged whether the value of N'max is 2. The diagonal component of the correlation coefficients is consistently "1." Therefore, if all the correlation coefficients other than the diagonal component are less than 0.9, the value of N'max is equal to 2 when the pass total N and the fail total N are added up. Then, parameters need not be further deleted. Consequently, if the value of N'max is judged to be 2 at Step 330, the processing at Step 370 and the following step is performed. If the value of N'max is not judged to be 2 at Step 330, it is judged at Step 340 whether the number of parameters which give N'max is 1.

If the number of parameters which give N'max is judged to be 1 at Step 340, the parameter which gives N'max is deleted at Step 360. If the number of parameters which give N'max is not judged to be 1 at Step 340, of the parameters which give N'max, those having a low priority are deleted at Step 350. Therefore, if the number of parameters which give N'max is not less than 2, it is required to determine which parameter should be deleted. In this embodiment, parameters to be deleted are determined based on the priorities given to the individual parameters in advance.

The priorities of parameters can be determined according to a variety of rules. For example, the priorities can be set based on the accuracy of form indicated by parameters. When sweeping is performed on a common pass/fail judgment object so that two or more lines are formed, as mentioned above, the reliability of data is enhanced as compared with cases where sweeping is performed so that one line is formed. Therefore, it is preferable that higher priorities should be given to parameters obtained from the form data 146b acquired through the former sweeping. Even if sweeping is performed so that one line is formed, differences are produced in the accuracy of form defined by parameters due to differences in the number of codes used in computation of the parameters and parameter computing expressions themselves. Priorities may be set with these taken into account. Needless to say, such a constitution that priorities are set based on accuracy is an example, and priorities may be set from any other point of view. The above numerical values are an example. The threshold for counting the number of correlation coefficients need not be 0.9. Multicolinearity may be eliminated by counting the number of negative correlation coefficients having a great absolute value.

After multicolinearity is eliminated by the above-mentioned processing, parameters to be incorporated as variables of discriminant functions are selected from among the remaining parameters at Step 370. In this selection of parameters, publicly known techniques, such as best-subset selection procedure, forward selection procedure, backward elimination procedure, and iterative procedure, can be used. Thus, parameters to be used as variables of discriminant functions are selected. Then, a discriminant function with these parameters taken as variables is computed at Step 380. The discriminant function is expressed as:

$$Z = a1x1 + a2x2 + a3x3 + \ldots anxn$$

where, ai is a coefficient; xi is a variable into which each parameter is substituted; and n is a number of selected parameters.

When the frequency distributions of pass category and fail category are produced with respect to the Z, the coefficients are determined so that Z which separates the distributions as much as possible will be given. The discriminant function is thereby computed. For example, it can be computed by determining coefficients which maximizes the correlation ratio η2 in Expression (2) below.

$$\eta^2 = \frac{S_B}{S_T} \quad \text{[Expression 2]}$$

$$S_T = \sum_{k=1}^{n_l} \sum_{l=1}^{2} (x_{kl} - \bar{x})^2$$

$$S_B = \sum_{l=1}^{2} n_l (x_l - \bar{x})^2$$

where, l is an identification sign for identifying pass category or fail category; nl is a number of samples on a category-by-category basis; and bar x is an aggregate average.

That is, when correlation ratio η2 is maximized, the ratio of total sum of squares ST to between-groups sum of squares SB is maximized. Under this situation, the between-groups variances of the categories are increased as much as possible (the averages of the categories are away from each other as much as possible), the variances of the individual categories are reduced as much as possible. Therefore, in terms of the frequency distributions for discriminant function, both the categories are separated very well. The above-mentioned computation of discriminant functions is described in details in Yutaka Tanaka and Kazumasa Wakimoto, "Multivariate Statistics Analysis," Gendai-Sugakusha, 1st ed. (1983). Other techniques than discrimination based on discriminant function Z may be used in the above-mentioned discriminant analysis. The present invention may be applied to discriminant analyses wherein pass/fail judgment is made based on Mahalanobis distance. Multigroup discriminant analysis which simultaneously discriminates pass category and subdivided fail categories may be used. The discriminant function computing portion 460b computes the individual coefficients ai, as mentioned above. Then, data indicating the coefficients and parameters is stored as discriminant function data 446d in the storage unit 446.

The statistical parameter computing portion 460c computes statistical parameters. The statistical parameters are used when a threshold is computed in the frequency distributions of pass category and fail category with respect to the discriminant function. The threshold determining portion 460d utilizes the statistical parameters to determine a threshold. In conventional discriminant analyses, Z=0 (midpoint between categories) is uniformly taken as a threshold. In the present invention, statistical parameters are taken into account when a threshold is determined. Actual processing is performed according to the flowchart illustrated in FIG. 19.

Figure 20:
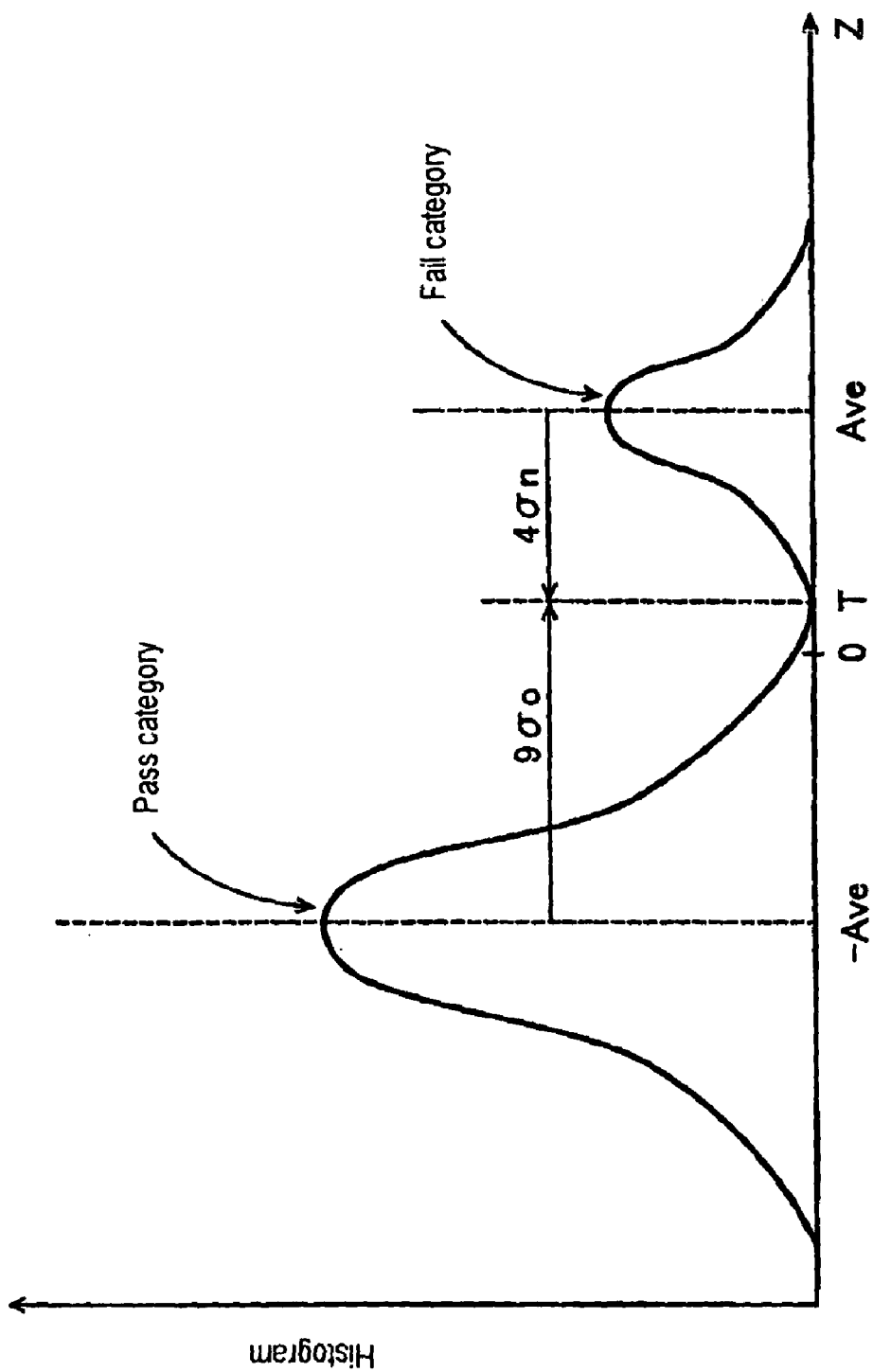
FIG. 20 is a drawing illustrating an example of a histogram.

At Step 400, the discriminant function data 446d is acquired, and at Step 410, a histogram of each category is generated with respect to discriminant functions. More specifically, the parameter value data 446d and pass/fail judgment result data 446c are required. Then, the individual parameter values are substituted into parameters defined as variables of the discriminant function data 446 d to compute the value of Z. Based on the acceptability thereof, frequency is measured for pass and for fail to generate the histogram. The thus generated histogram is plotted, for example, as illustrated in FIG. 20. The distribution of the individual category is represented substantially in normal distribution, and the bottoms thereof overlap each other. In actual board inspection, the number of distributions of fail category is often significantly smaller than plotted in the figure.

At Step 420, mean and standard deviation are computed in the histogram generated as illustrated in FIG. 20 with respect to each category. Needless to say, the mean in this case is an example of the center of distribution. Other examples of the center of distribution include mode and median. These values may be utilized with the subject matter of the present invention incorporated. The standard deviation is an example of parameters indicating the breadth of distribution. Similarly, parameters indicating the breadth of distribution include variance and a value with the range divided (by 25% or so, for example). Again, these values may be utilized with the subject matter of the present invention incorporated. In the figure, discriminant function Z=0 is positioned at the center of the means of both the categories. The mean of fail category is indicated as "Ave", and the mean of pass category is indicated as "−Ave." The standard deviation of fail category is indicated as σn, and the standard deviation of pass category indicated as σo.

After the mean and standard deviation are computed at Step 420, input of a rate of flowout is accepted through the input unit 420 at Step 430. The multivariate statistics analyzer 400 is so designed that a rate of flowout can be inputted through the input unit 420. A threshold is determined based on this rate of flowout. Rate of flowout is a rate at which defective pass/fail judgment objects are judged as passed and the defective units are let out without being detected. The rate of flowout can be computed by the standard deviation σn of fail category.

According to standard deviation σn, a probability that a variable is contained between mean and standard deviation in normal distribution can be identified with ease. Or, a probability that a variable is contained in the bottom portion outside standard deviation can be identified with ease. The rate of flowout can be made equal to an inputted value, by multiplying the standard deviation by a constant. For example, in case of 4σn illustrated in FIG. 20, 0.00031 of the total will be let out in the frequency distribution of fail category. At Step 430, input of a rate of flowout itself may be accepted, or input of a coefficient by which the standard deviation is multiplied may be accepted. Alternatively, a rate of flowout may be identified based on the previously stored rate of flowout data 446e (or standard deviation data) as illustrated in FIG. 14.

In any case, after a rate of flowout is accepted and that value is confirmed at Step 430, such a threshold T as to give the rate of flowout is temporarily determined at Step 440. In the example illustrated in FIG. 20, a threshold T is temporarily determined by T=Ave−4σn. In this embodiment, in addition to rate of flowout control, rate of overcontrol is also controlled. In this sense, the threshold T at Step 440 is a temporarily determined value. Rate of overcontrol is a probability that pass/fail judgment objects are non-defective units and yet judged as failed. In other words, it is a probability that a situation where a too strict threshold is adopted (overcontrol) occurs. The rate of overcontrol can be computed by the standard deviation σn of pass category.

In case of this embodiment, at Step 450, the rate of overcontrol data 446f is acquired, and it is judged whether (T+Ave)/σo is greater than 9. Thereby, it is judged whether the temporarily determined threshold T is away from the mean of pass category by 9 times the standard deviation σo thereof or more. If (T+Ave)/σo is judged to be greater than 9 at Step 450, it turns out that the temporarily determined threshold T is a satisfactory value in terms of both rate of flowout and rate of overcontrol. Then, the threshold T is stored as threshold data 446g in the storage unit 446. If (T+Ave)/σo is not judged to be greater than 9 at Step 450, the rate of overcontrol is considered to be too high, and parameters are redetermined.

More specifically, it is judged that parameters which allow correct judgment on the acceptability of the forms of pass/fail judgment objects have not been obtained. Then, the parameters themselves are reconsidered and new parameters are determined. This redetermination makes it possible to prevent the operation of a pass/fail judgment device from being initiated before a satisfactory rate of flowout or rate of overcontrol is not ensured. Thus, a device capable of making high-performance judgment even in the beginning of operation can be provided. Further, the device can be made to deliver high performance without accumulating know-how. In this embodiment, the rate of overcontrol data 446f is stored beforehand in the storage unit 446. Needless to say, such a constitution that a value for determining the rate of overcontrol is inputted through the input unit 420 may be adopted.

After the threshold T is determined as mentioned above, the laser inspecting instrument 100 acquires threshold data 446g identifying the threshold T. Thus, pass/fail judgment can be made so that desired rate of flowout and rate of overcontrol will be obtained. In the above example, pass/fail judgment is made under two categories, pass category and fail category, in processing by the mode classifying portion 460a through the threshold determining portion 460d. Needless to say, the fail category may be subdivided, and new categories may be created on a cause-by-cause basis (e.g. "lift-off," "insufficient solder," etc.) In this case, it is preferable that pass/fail judgment should be made on a cause-by-cause basis. For this purpose, the discriminant function computing portion 460b through the threshold determining portion 460d analyze pass category and cause-by-cause subcategories when a threshold is determined.

(6) Other Embodiments

In the present invention, a variable value which gives a specific distribution probability in either or both of pass category and fail category is taken as the threshold. Thereby, the rate of flowout and rate of overcontrol are controlled to desired values. Various constitutions may be adopted as long as the foregoing is implemented. Needless to say, the above-mentioned product data, pass/fail judgment result data, rate of flowout data, rate of overcontrol data, and the like may be determined and stored beforehand. Thus, a device which automatically determines a threshold and makes pass/fail judgment can be provided.

Figure 21:
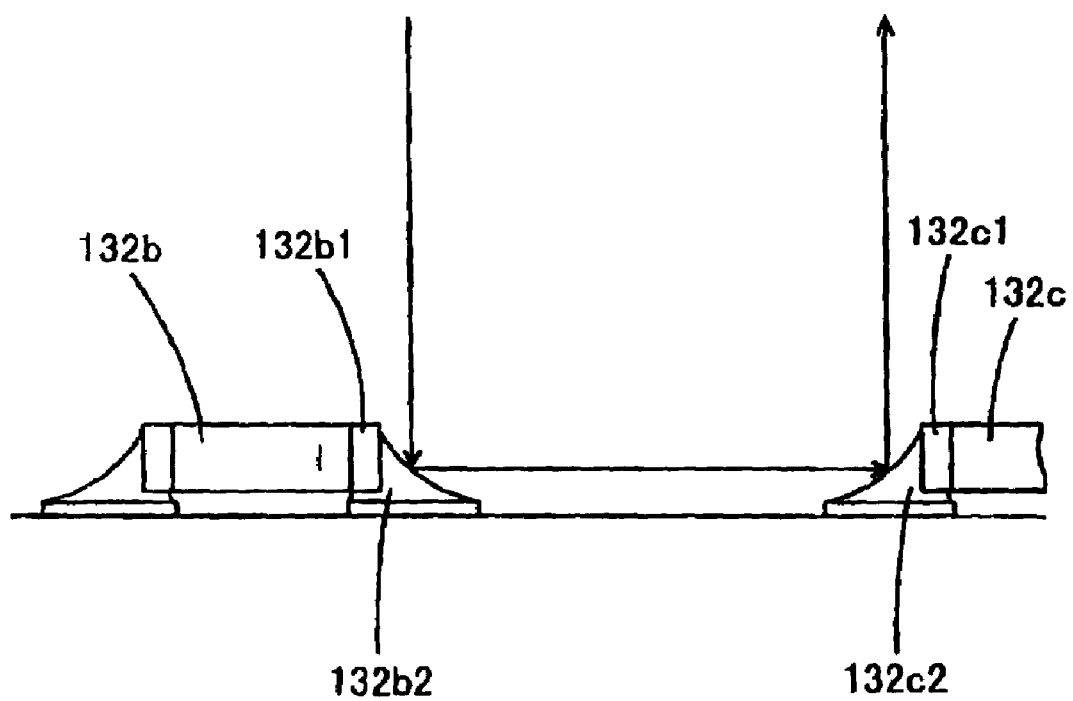
FIG. 21 is a drawing illustrating an example of a case where opposed reflection occurs.
Figure 22:
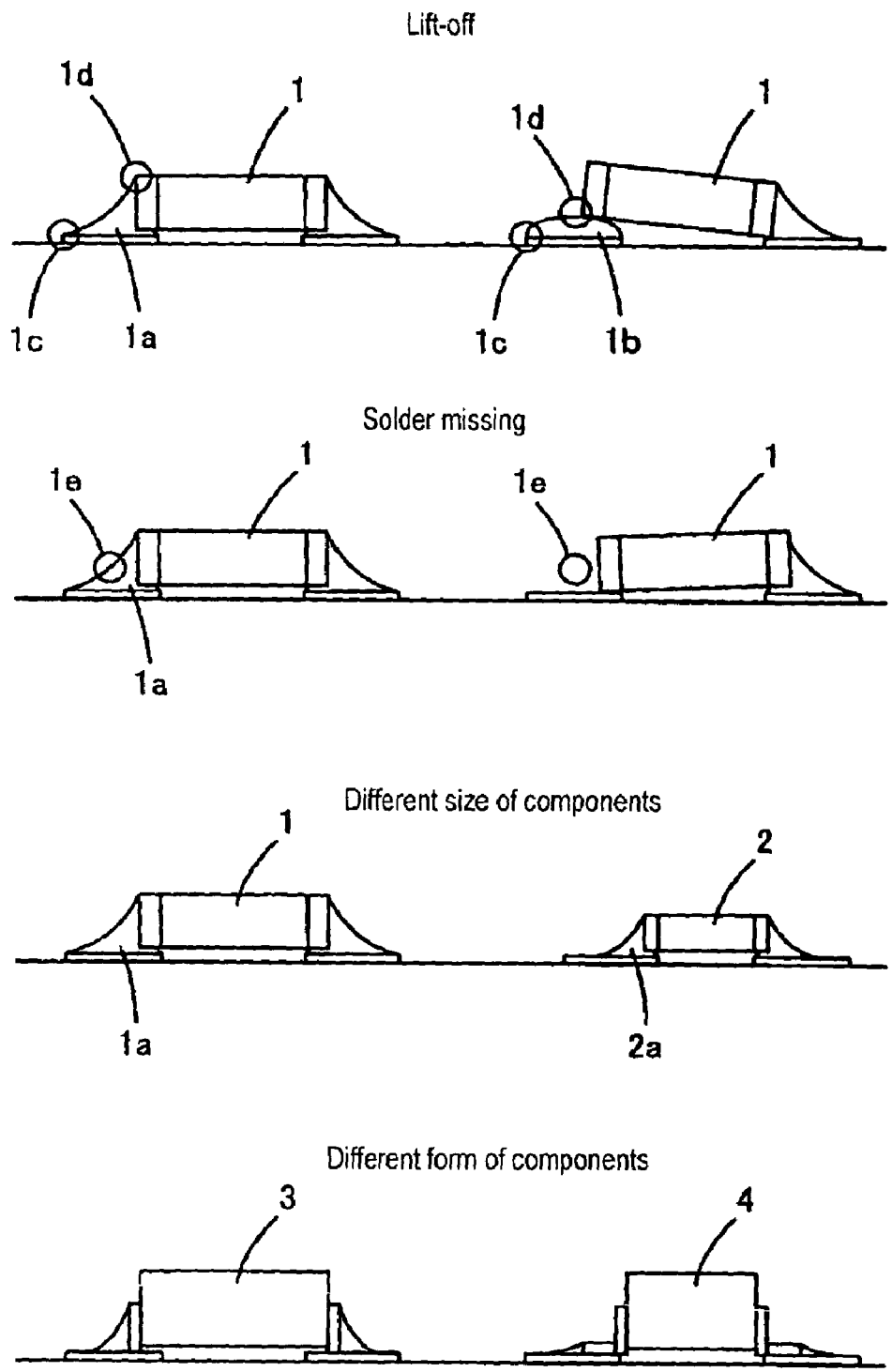
FIG. 22 is an explanatory drawing explaining examples of various states of various components soldered onto a board.

Further, various contrivances can be incorporated in the individual devices. An example of such contrivances is as follows: usually, a plurality of components are mounted on a board. A contact of a mounted component may be positioned in proximity to a contact of another mounted component. In this case, form data may not be correctly detected due to opposed reflection between the contacts. FIG. 21 illustrates an example of the occurrence of opposed reflection. The component 132b and the component 132c are mounted on a board in alignment with each other, and the contacts 132b1 and 132c1 and the solder joints 132b2 and 132c2 thereof are respectively opposed to each other.

It is assumed that on the laser inspecting instrument 100, the solder 132b2 is irradiated with laser light. If the laser light reflected in the center of the upper face of the solder 132b2 in the direction of the mounted component 132c, the laser light may be reflected at the upper face of the solder 132c2 again and travel upward. When the laser light traveling upward reaches any of the sensors in the photo acceptance box 110, form data is acquired. In this case, the form data 146b is different from that acquired when opposed reflection does not occur.

In the present invention, some measure against opposed reflection may be taken. For example, different criteria (i.e. different parameters and different thresholds) can be adopted for contacts where opposed reflection occurs and for contacts where opposed reflection does not occur. In the present invention, a certain number of pieces of pass/fail judgment result data 246b must be accumulated before the operation is initiated. The points where opposed reflection illustrated in FIG. 21 may occur and the number of such points are finite. With respect to finite points and numbers, it is inefficient to make a large number of times of pass/fail judgment to draw sample or artificially generate samples beforehand.

Consequently, the same form data 146b and parameters as for points free from the occurrence of opposed reflection are accumulated, and further a measure is taken. That is, criteria for deleting/selecting parameters at Step 300 to S370 are changed for points where opposed reflection occurs and for points free from occurrences. As a result, a different criterion based on different parameters can be obtained. More concrete examples of techniques therefor include a technique associated with the setting of priorities considered at Step 350. Parameters generated using a large number of the code values which can be influenced by opposed reflection are given lower priorities. Or, such parameters themselves may be deleted. By this processing, it is obviated to create completely different parameters from the beginning depending of the presence/absence of opposed reflection. Different criteria can be created with ease.

On the premise that the frequency distribution of each category is produced in normal distribution, in the multivariate statistics analysis, thresholds are determined by statistical parameters. Therefore, if the frequency distribution does not resemble normal distribution, there is a danger that statistical parameters are not appropriately computed. Measures against this may be taken. For example, whether a frequency distribution contains skewness or peakedness as compared with normal distribution is expressed by a value relative to a value in actual frequency and normal distribution with respect to each variable. If the relative value exceeds a predetermined value, the frequency is converted by logarithmic conversion or the like so that the value will be in the extent of a reference relative value.

In the above-mentioned embodiment, discriminant analysis is adopted as multivariate statistics analysis. In the present invention, variables which separate the frequency distributions of pass category and fail category and the statistical parameters thereof only have to be acquired. Though discriminant analysis is preferable, it is not indispensable. For example, multiple regression analysis may be used. A multiple regression expression which takes the results of pass judgment or fail judgment as response variables is computed by linear combination of explanatory variables into which the individual parameters in multiple regression analysis. Then, a histogram of the response variables of the multiple regression expression is plotted, and a variable value which gives the specific distribution probability in the histogram is computed and taken as a threshold. Needless to say, other analyzing techniques may be adopted.

In the above-mentioned embodiment, the pass/fail judgment device is applied to the laser inspecting instrument 100, and the acceptability of the mounted state of components is judged by the form of solder thereon. Needless to say, the present invention is applicable to other pass/fail judgment objects. For example, the means for acquiring form data 146b is not limited to sensors which detect the reflected light of the irradiated laser light. X-rays can be used instead of irradiated electromagnetic waves, and X-ray detectors can be used in place of the sensors. Thus, a similar inspecting instrument can be provided, and a high-performance pass/fail judgment device based on similar multivariate analysis can be provided. Needless to say, detection of the direction of reflected light is indispensable to the acquisition of form data. Transmitted light may be used, and the intensity of light may be detected instead of the direction thereof.

Visible light, infrared rays, or the like may be utilized. Images may be picked up, and the image data on the images may be converted into a plurality of parameters by various conversion expressions. Then, high-performance pass/fail judgment may be made by the multivariate analysis of the present invention. As objects whose images are to be picked up, polarity marks put on mounted components and pattern recognition objects, such as human faces and patterns on roads, can be adopted. The examples of the former include polarity marks put on elements, such as diodes, having directional electrical characteristics.

According to polarity marks, the acceptability of the orientation of mounted components can be judged. Based on the image data of images picked up, the degree of matching with marks for acceptable orientation and the degree of matching with marks for unacceptable orientation can be taken as parameters. Then, the result of pass/fail judgment with the individual parameter values can be stored. Thus, the pass/fail judgment of the present invention can be implemented. This is also the case with pattern recognition and the like. Parameters representing the degree of matching with a specific pattern, a specific form, the positions of the edges of an image, or the like are determined. The parameters are stored together with pass or fail judgment results. Thus, the pass/fail judgment of the present invention can be implemented.

In the above-mentioned embodiment, pass/fail judgment objects are irradiated with laser light, and the reflected light therefrom is used to generate form data and a plurality of parameters. That is, pass/fail judgment is made using data obtained by directly observing pass/fail judgment objects. However, a device which makes pass/fail judgment on indirectly inferable phenomena by observational data can be provided.

For example, a device which judges the acceptability of printed solder before a plurality of components are mounted on a board, as mentioned above, can be formed. In this case, the state of printed solder before components are mounted is measured by irradiation of laser light and detection of the reflected light thereof. Then, a plurality of the parameters are computed from data on this state of print. The acceptability of the state of component mounting is adopted as pass/fail judgment results, and the individual sets of the parameters are correlated with the results. Then, the multivariate statistics analysis is carried out based on these parameters and pass/fail judgment results. Thus, a threshold can be determined in the same manner as mentioned above, and using the threshold, pass/fail judgment can be made so that an intended rate of flowout and rate of overcontrol will be obtained.

As described above, according to the present invention, discriminant functions are computed using a plurality of parameters which make pass/fail judgment factors and pass/fail judgment results thereof. By the discriminant functions, a histogram is generated with respect to pass category and fail category. Based on the standard deviation of each category, a threshold is determined so that an intended rate of flowout and rate of overcontrol will be obtained. Based on this threshold, judgment is made on pass/fail judgment objects. Thus, the rate of flowout and rate of overcontrol can be controlled as intended. Further, high-performance pass/fail judgment can be implemented without accumulating know-how.

We claim:

1. A pass/fail judgment device which takes the form of pass/fail objects as a pass/fail judgment factor, and which is used to detect a defective unit in product inspection, comprising:

a discriminant function computing unit for computing discriminant functions which give variables used to separate frequency distributions of a pass category and a fail category from a plurality of pieces of parameter information which make pass/fail judgment factors and pass/fail judgment result information, wherein each of the frequency distributions of the pass category and the fail category has a shape of a normal distribution;

a statistical parameter computing unit for computing a center of distribution and distribution parameters that vary in accordance with a breadth of a distribution for said variables with respect to either or both of said pass category and said fail category;

a threshold determining unit for determining a threshold for providing a pass/fail judgment based on the value of a variable and giving a specific distribution probability that is based on at least one of a rate of flowout in the fail category, which represents a number of pass/fail judgment objects that are actually in the fail category and that are judged as being passed, and a rate of overcontrol in the pass category, which represents a number of pass/fail judgment objects that are actually in the pass category and that are judged as being failed, relative to said center of distribution and said distribution parameters;

a parameter information acquiring unit for acquiring a plurality of pieces of parameter information on one or more pass/fail judgment objects according to data of a normal distribution; and a pass/fail judging unit for comparing the value of variables obtained by substituting the parameter information into said discriminant function with said threshold and for thereby providing a pass/fail judgment for the one or more pass/fail judgment objects;

wherein the overcontrol and flowout are separated having the normal distribution, wherein the overcontrol and flowout are judged based on the data of the normal distribution.

2. The pass/fail judgment device according to claim 1, wherein
a plurality of pieces of said parameter information is obtained by converting specified inspection data obtained as the result of inspecting a plurality of said pass/fail judgment objects with a specified inspecting instrument in advance into parameters which represent different pass/fail judgment factors by a plurality of different conversion expressions, and is stored in a specified storage medium, and
a plurality of pieces of parameter information on said pass/fail judgment objects acquired by said parameter information acquiring unit and the results of pass/fail judgment by said pass/fail judging unit are additionally stored in the specified storage medium.

3. The pass/fail judgment device according to claim 2, wherein
the judgment device comprises a unit for inputting the results of visual pass/fail judgment on said pass/fail judgment objects,
said pass/fail judgment result information indicating the results of said visual pass/fail judgment is correlated with the parameter information on said pass/fail judgment objects, and
if the results of pass/fail judgment by said pass/fail judging unit and the results of said visual pass/fail judgment are different from each other, the results of the visual pass/fail judgment are additionally stored as correct judgment results in said specified storage medium.

4. The pass/fail judgment device according to claim 2, wherein
the judgment device comprises a unit for inputting the causes for visual pass/fail judgment and the results of the visual pass/fail judgment on said pass/fail judgment objects,
either or both of said pass category and fail category are subdivided by cause for the pass/fail judgment and taken as said pass/fail judgment result information, and
said discriminant function computing unit computes discriminant functions which give variables which separate the frequency distributions of the subdivided pass category and fail category.

5. The pass/fail judgment device according to claim 1, wherein
said statistical parameter computing unit computes a mean and standard deviation of said fail category, and
said threshold determining unit takes as said threshold said variable value equivalent to a value which is away from said mean of said fail category by a constant multiple of the standard deviation thereof.

6. The pass/fail judgment device according to claim 5, wherein
said statistical parameter computing unit computes the mean and standard deviation of said pass category, and
said threshold determining unit judges by what multiple of the standard deviation the threshold determined by said mean and standard deviation of said fail category is away from said mean of said pass category, and thereby computes a rate of occurrence of said overcontrol with that threshold.

7. The pass/fail judgment device according to claim 1, wherein the judgment device comprises:
an electromagnetic wave applying unit for irradiating pass/fail judgment objects with predetermined electromagnetic waves;
an electromagnetic wave detecting unit for detecting reflected electromagnetic waves or transmitted electromagnetic waves produced as the result of the application of the electromagnetic waves; and
an electromagnetic wave data generating unit for generating electromagnetic wave data from the detection values of reflected electromagnetic waves or transmitted electromagnetic waves detected by the electromagnetic wave detecting unit, and
said discriminant function computing unit and said parameter information acquiring unit substitute said electromagnetic wave data into a plurality of different conversion expressions to compute values corresponding to the forms of pass/fail judgment objects, and take the computed values as a plurality of pieces of said parameter information.

8. The pass/fail judgment device according to claim 7, wherein the judgment device comprises:
a positional information acquiring unit for acquiring positional information on pass/fail judgment objects; and
an arrangement analyzing unit for, when electromagnetic waves reflected by a plurality of pass/fail judgment objects more than once are detected by said electromagnetic wave detecting unit, grasping the arrangement of the pass/fail judgment objects from said positional information, and
said discriminant function computing unit disuses or gives lower priorities to said parameters to which said electromagnetic waves reflected more than once greatly contribute.

9. The pass/fail judgment device according to claim 1, wherein
in computing discriminant functions having as a variable any of a plurality of said parameters, the discriminant function computing unit computes correlation coefficients between the parameters, counts the number of parameters which give a correlation coefficient not less than a predetermined value in said pass category and said fail category, disuses parameters having a high count, and repeats this processing to eliminate multicolinearity.

10. The pass/fail judgment device according to claim 1, wherein
in computing discriminant functions having as a variable any of a plurality of said parameters, said discriminant function computing unit disuses parameters in increasing order of priorities given to the parameters in advance, and repeats this processing to eliminate multicolinearity.

11. A quality control apparatus which takes the form of pass/fail objects as a pass/fail judgment factor and which is used to detect a defective unit in product inspection, comprising:
a statistical computing unit configured to receive object data representing one or more characteristics of an object and compute at least one of a first probability that the object will be classified in a first category and a second probability that the object will be classified in a second category based on the received object data wherein frequency distributions of the first probability and the second probability has a shape of a normal distribution;
an input unit configured to receive at least one of a rate of flowout in the second category, which represents a number of objects that actually are in the second category that are actually classified as being in the first category, and a rate of overcontrol in the first category, which represents a number of objects that actually are in the first category that are judged as being in the second category;

a calculation unit configured to calculate a discriminate function to discriminate between one or more objects classified in the first category from one or more objects classified in the second category based on the at least one of the rate of flowout in the second category and the rate of overcontrol in the first category received by the input unit and based on at least one of the first and second probabilities computed by the statistical computing unit;

a judging unit configured to determine whether one or more objects should be classified in one of the first and second categories based on the discriminate function calculated by the calculation unit; and a communication unit configured to communicate whether the object is classified in one of the first and second categories based on the determination of the judging unit;

wherein the judging unit has a standard deviation based on a normal distribution of the objects, wherein the overcontrol and flowout are separated having the normal distribution; and wherein the overcontrol and flowout are judged based on the data of the normal distribution.

12. The quality control apparatus of claim 11, further comprising a detector configured to detect physical characteristics of the object and communicate the detected physical characteristics of the object to the statistical computing unit.

13. The quality control apparatus of claim 12, wherein the detected physical characteristics of the object include an orientation of one component of the object relative to another component of the object.

14. The quality control apparatus of claim 12, wherein the detector comprises a laser inspecting instrument.

15. The quality control apparatus of claim 11, wherein the at least one of the rate of flowout and the rate of overcontrol comprises a visual observation by an operator of an actual orientation of one component of the object relative to another component of the object.

16. The quality control apparatus of claim 15, wherein the visual observation by the operator occurs after the statistical computing unit has computed at least one of the first and second probabilities.

17. The quality control apparatus of claim 11, wherein the one or more characteristics of the object include label data and form data.

18. The quality control apparatus of claim 11, wherein the first category comprises a pass category, which represents a group of one or more objects that satisfy a predetermined criteria, and the second category comprises a fail category, which represents another group of one or more objects that do not satisfy the predetermined criteria.

19. The quality control apparatus of claim 11, wherein the first category comprises a group of one or more objects that have a higher degree of quality than another group of one or more objects in the second category.

20. The quality control apparatus of claim 11, wherein the discriminate function is different from a midpoint between a mean value of a first probability distribution and a mean value of a second probability distribution.

21. The quality control apparatus of claim 11, wherein the communication unit comprises a display unit arranged to provide a visual representation of whether the object is classified in one of the first and second categories based on the determination of the judging unit.

22. A computer-implemented quality control method taking the form of pass/fail objects as a pass/fail judgment factor for detecting a defective unit in product inspection, comprising:

receiving object data representing one or more physical characteristics of an object;

computing with a microprocessor a first probability distribution, which represents a probability that one or more objects should be classified in a first category, based on the received object data;

computing with the microprocessor a second probability distribution, which represents a probability that one or more objects should be classified in a second category, based on the received object data;

wherein frequency distributions of the first category and the second category has a shape of a normal distribution, computing a center of distribution and distribution parameters that vary in accordance with a breadth of distribution for said variables with respect to either or both of said first category or said second category;

receiving a rate of flowout in the second category, which represents a number of objects that should be classified in the second category, but are actually judged as being classified in the first category relative to said center of distribution and said distribution parameters;

receiving a rate of overcontrol in the first category representing a number of objects that should be classified in the first category, but are actually judged as being classified in the second category relative to said center of distribution and said distribution parameters;

calculating a discriminate function to discriminate between one or more objects that should classified in the first category from one or more objects that should be classified in the second category based on the first and second probability distributions computed by the statistical computing unit and based on at least one of the received rate of flowout and the received rate of overcontrol;

determining whether one or more objects should be classified in one of the first and second categories based on the discriminate function calculated by the calculation unit; and communicating the determination of whether the one or more objects are classified in one of the first and second categories to an operator;

wherein the rate of overcontrol and flowout are separated having normal distribution; and wherein the overcontrol and flowout are judged based on the data of the normal distribution.

23. The computer-implemented quality control method of claim 22, further comprising detecting physical characteristics of the object and communicating the detected physical characteristics of the object to the statistical computing unit.

24. The computer-implemented quality control method of claim 23, wherein the detected physical characteristics of the object include an orientation of one component of the object relative to another component of the object.

25. The computer-implemented quality control method of claim 22, wherein the one or more physical characteristics of the object include label data and form data representing one or more structural features of the object.

26. The computer-implemented quality control method of claim 22, wherein the first category comprises a pass category, which represents a group of one or more objects that satisfy a predetermined criteria, and the second category comprises a fail category, which represents another group of one or more objects that do not satisfy the predetermined criteria.

27. The computer-implemented quality control method of claim 22, wherein the first category comprises a group of one or more objects that have a higher degree of quality than another group of one or more objects of the second category.

28. The computer-implemented quality control method of claim 22, wherein the received rate of flowout and the received rate of overcontrol comprise a visual observation by the operator of an actual orientation of one component of the object relative to another component of the object.

29. The computer-implemented quality control method of claim 22, wherein the discriminate function is different from a midpoint between a mean value of the first probability distribution and a mean value of the second probability distribution.

30. A multivariate statistics analyzer which is capable of communication of data with the outside through a communication interface and executes a multivariate analysis program under the control of a predetermined operating system, wherein
    said multivariate statistics analyzer comprises a hard disk drive which is capable of accumulating the multivariate analysis program and transmitting, receiving, and accumulating data,
    said multivariate analysis program comprises modules corresponding to a mode classifying portion which includes parameter value data consisting of parameter values which are correlated with at least pass/fail judgment result data of one or more pass/fail judgment objects as a pass/fail judgment factor, and which are used to detect a defective unit in product inspection when the data is externally acquired through said communication interface and stored in said hard disk drive and are actually computed with respect to each defective unit, and subdivides categories based on the accumulated data;
    a discriminant function computing portion which eliminates multicolinearity, gives variables used to separate frequency distributions of a pass category and a fail category from a plurality of pieces of information which make pass/fail judgment factors and pass/fail judgment result information, wherein each of the frequency distributions of the pass category and the fail category has a shape of a normal distribution, and further computes discriminant functions based on said parameter value data;
    a statistical parameter computing portion which computes a center of distribution parameters and that vary in accordance with a breadth of a distribution for variables with respect to either or both of a pass category and a fail category, and the mean and standard deviation in the frequency distributions of said pass category and said fail category with respect to said discriminant functions; and
    a threshold determining portion for determining a threshold for providing a pass/fail judgment based on the value of a variable defined by a specific distribution probability based on at least one of a rate of flowout in the fail category, which represents a number of pass/fail judgment objects are actually in the fail category, and that are judged as being passed, and a rate of overcontrol in the pass category, which represents a number of pass/fail judgment objects that are actually in the pass category, and that are actually judged as being failed, relative to said center of distribution and said distribution parameter, and
    the threshold determining portion further performs the operations of acquiring said discriminant function data, said parameter value data, and pass/fail judgment result data, generating a histogram corresponding to a pass/fail judgment result on a category-by-category basis, computing a mean and a standard deviation of each category in the generated histogram, determining the threshold of a discriminant function corresponding to a specified rate of flowout which is set for the fail category and indicates the range in which defective units are let out, based on the mean and standard deviation computed in the fail category and the rate of flowout; and
    a pass/fail judgment display portion configured to display a pass/fail judgment for the one or more pass/fail judgment objects based on the threshold determined by the threshold determining portion;
    wherein the overcontrol and flowout are separated having the normal distribution; and
    wherein the overcontrol and flowout are judged based on the data of the normal distribution.

31. The multivariate statistics analyzer according to claim 30, wherein
    said threshold determining portion is externally fed with said rate of flowout and determines the threshold of said discriminant function so that the inputted rate of flowout will be obtained.

32. The multivariate statistics analyzer according to claim 31, wherein
    said threshold determining portion determines as a threshold the range from the mean to four times the standard deviation which is considered to be the range corresponding to said rate of flowout.

33. The multivariate statistics analyzer according to claim 30, wherein
    said threshold determining portion judges the suitability of said determined threshold of discriminant function based on the mean and standard deviation computed in a pass category and said specified rate of overcontrol which is set for said pass category and indicates the range in which non-defective units are judged as defective units.

34. The multivariate statistics analyzer according to claim 33, wherein
    said threshold determining portion judges the suitability of said threshold depending on whether the threshold falls in the range from the mean to nine times the standard deviation which is considered to be the range corresponding to said rate of overcontrol.

35. A pass/fail judgment method taking the form of pass/fail objects as a pass/fail judgment factor for detecting a defective unit in product inspection, comprising:
    computing with a microprocessor discriminant functions which give variables which separate frequency distributions of a pass category and a fail category from a plurality of pieces of parameter information which make pass/fail judgment factors and pass/fail judgment result information thereof wherein frequency distributions of the pass category and the fail category has a shape of a normal distribution;
    computing with the microprocessor a center of distribution and distribution parameters that vary with a breadth of a distribution for said variables with respect to either or both of said pass category and said fail category;
    determining a threshold for providing a pass/fail judgment based on the value of a variable value and giving a specific distribution probability based on at least one of a rate of flowout in the fail category, which represents a number of pass/fail judgment objects that are actually in the fail category that are judged as being passed, and a rate of overcontrol in the pass category, which represents a number of pass/fail judgment objects that are actually in the pass category that are judged as being failed, relative to said center of distribution and said distribution parameters;

acquiring a plurality of pieces of said parameter information on one or more pass/fail judgment objects according to data of a normal distribution; and comparing the value of variables obtained by substituting the parameter information into said discriminant functions with said threshold; and displaying a pass/fail judgment for the one or more pass/fail judgment objects based on the comparing step;

wherein the rate of overcontrol and flowout are separated having the normal distribution; and wherein the pass/fail judgment are judged based on the normal distribution.

36. A pass/fail judgment method taking the form of pass/fail objects as a pass/fail judgment factor for detecting a defective unit in product inspection, comprising:

a discriminant function computing step in which discriminant functions which give variables which separate frequency distributions of a pass category and a fail category are computed with a microprocessor from a plurality of pieces of parameter information which make pass/fail judgment factors and pass/fail judgment result information thereof wherein each of the frequency distributions of the pass category and the fail category is the shape of a normal distribution;

a statistical parameter computing step in which a center of distribution and distribution parameters that vary in accordance with a breadth of a distribution for said variables are computed with the microprocessor with respect to either or both of said pass category and said fail category;

a threshold determining step for determining a threshold for providing a pass/fail judgment based on a value of a variable representing a specific distribution probability based on at least one of a rate of flowout in the fail category, which represents a number of pass/fail judgment objects that are actually in the fail category, and that are judged as being passed, and a rate of overcontrol in the pass category, which represents a number of pass/fail judgment objects that are actually in the pass category, and that are judged as being failed, relative to said center of distribution and said distribution parameters;

a parameter information acquiring step in which a plurality of pieces of said parameter information on one or more pass/fail judgment objects are acquired according to data of a normal distribution; and a pass/fail judging step in which the value of variables obtained by substituting the parameter information into said discriminant functions are compared with said threshold, and a pass/fail judgment for the one or more pass/fail judgment objects is displayed based on the comparison with said threshold;

wherein the rate of overcontrol and flowout are separated having the normal distribution; and wherein the pass/fail judging step is judged based on the normal distribution.

37. A computer-implemented quality control apparatus used to detect a defective unit in a product inspection, comprising:

a detector configured to detect physical characteristics of an object and generate object data representing the detected physical characteristics of the object;

a statistical parameter computing unit configured to compute a center of distribution and distribution parameters that vary in accordance with a breadth of distribution for variables with respect to either or both of a non-defective object probability representing a probability that one or more objects should be classified in a non-defective category based on the object data generated by the detector, compute a defective object probability representing a probability that one or more objects should be classified in a defective category based on the object data generated by the detector, classify the one or more objects as being in the non-defective category based on a match between a first pattern of object data and the computed non-defective object probability, and classify the one or more objects as being in the defective category based on a match between a second pattern of object data and the computed defective object probability;

an input unit configured to receive a rate of flowout in the defective category, which represents a number of objects that are actually in the defective category by the statistical computing unit, and that are judged as being non-defective, and a rate of overcontrol in the non-defective category, which represents a number of objects that are actually in the non-defective category by the statistical computing unit, and that are judged as being defective, the received rate of flowout and the received rate of overcontrol including a visual observation by an operator of an actual orientation of one component of the object relative to another component of the object;

a calculation unit configured to calculate a discriminate function to discriminate between defective and non-defective objects based on the non-defective category and defective object probability distributions computed by the statistical computing unit and based on the feedback data received by the input unit, the discriminate function being different from a midpoint between a mean value of the first probability distribution and a mean value of the second probability distribution wherein frequency distributions of the non-defective category and the defective category has a shape of a normal distribution;

a judging unit configured to determine whether the one or more objects should be classified in one of the defective or non-defective categories based on the discriminate function calculated by the calculation unit; and classifying the one or more objects as being in the defective category based on a match between a second pattern of object data and the computed defective object probability distribution;

receiving an rate of flowout in the defective category, which represents a number of objects that are actually in the defective category, and that are judged as being non-defective, the received rate of flowout including a visual observation by an operator of an actual orientation of one component of the object relative to another component of the object;

receiving a rate of overcontrol in the non-defective category, which represents a number of objects that are actually in the non-defective category, and that are actually in the defective category, the received rate of overcontrol including a visual observation by an operator of an actual orientation of one component of the object relative to another component of the object;

calculating a discriminate function to discriminate between one or more objects classified in the non-defective category from one or more objects classified in the defective category based on at least one of the received rate of flowout and the received rate of overcontrol and based on the computed non-defective and defective object probability distributions, the discriminate function being different from a midpoint between a mean value of the computed non-defective object probability distribution and a mean value of the computed defective object probability distribution wherein frequency distributions of the non-defective category and the defective category has a shape of a normal distribution;

a display unit configured to display whether the one or more objects are classified in one of the defective or non-defective categories based on the determination of the judging unit;

wherein the rate of overcontrol and the rate of flowout are separated having the normal distribution; and wherein the overcontrol and flowout are judged based on the data of the normal distribution.

38. A computer-implemented quality control method taking the form of pass/fail objects as a pass/fail judgment factor, and used to detect a defective unit in product inspection, comprising:

detecting physical characteristics of an object;

generating object data representing the detected physical characteristics of the object;

computing with a microprocessor a non-defective object probability distribution representing a probability that one or more objects should be classified in a non-defective category based on the generated object data;

computing with the microprocessor a defective object probability distribution representing a probability that one or more objects should be classified in a defective category based on the generated object data;

classifying the one or more objects as being in the non-defective category based on a match between a first pattern of object data and the computed non-defective object probability distribution;

determining whether one or more objects should be classified in one of the defective or non-defective categories based on the calculated discriminate function; and displaying an image that illustrates whether the one or more objects are classified in one of the defective or non-defective categories based on the determining step;

wherein the rate of overcontrol and the rate of flowout are separated having normal distribution; and wherein the overcontrol and flowout are judged based on the data of normal distribution.

* * * * *

UNITED STATES PATENT AND TRADEMARK OFFICE
CERTIFICATE OF CORRECTION

| | | |
|---|---|---|
| PATENT NO. | : 7,610,168 B2 | Page 1 of 3 |
| APPLICATION NO. | : 10/646942 | |
| DATED | : October 27, 2009 | |
| INVENTOR(S) | : Yasuo Isumi and Kou Hirano | |

It is certified that error appears in the above-identified patent and that said Letters Patent is hereby corrected as shown below:

On the front face of the patent at item (73) Assignees:, the name "Kabsuhki" should read --Kabushiki--;

At column 41, line 65 through column 44, line 26, delete claims 37 and 38 and insert in place thereof the following claims 37 and 38:

-- 37. A computer-implemented quality control apparatus used to detect a defective unit in a product inspection, comprising:

a detector configured to detect physical characteristics of an object and generate object data representing the detected physical characteristics of the object;

a statistical parameter computing unit configured to compute a center of distribution and distribution parameters that vary in accordance with a breadth of distribution for variables with respect to either or both of a non-defective object probability representing a probability that one or more objects should be classified in a non-defective category based on the object data generated by the detector, compute a defective object probability representing a probability that one or more objects should be classified in a defective category based on the object data generated by the detector, classify the one or more objects as being in the non-defective category based on a match between a first pattern of object data and the computed non-defective object probability, and classify the one or more objects as being in the defective category based on a match between a second pattern of object data and the computed defective object probability;

an input unit configured to receive a rate of flowout in the defective category, which represents a number of objects that are actually in the defective category by the statistical computing unit, and that are judged as being non-defective, and a rate of overcontrol in the non-defective category, which represents a number of objects that are actually in the non-defective category by the statistical computing unit, and that are judged as being defective, the received rate of flowout and the received rate of overcontrol including a visual observation by an operator of an actual orientation of Signed and Sealed this
Eighth Day of May, 2012

David J. Kappos
*Director of the United States Patent and Trademark Office* one component of the object relative to another component of the object;

a calculation unit configured to calculate a discriminate function to discriminate between defective and non-defective objects based on the non-defective category and defective object probability distributions computed by the statistical computing unit and based on the feedback data received by the input unit, the discriminate function being different from a midpoint between a mean value of the first probability distribution and a mean value of the second probability distribution wherein frequency distributions of the non-defective category and the defective category has a shape of a normal distribution;

a judging unit configured to determine whether the one or more objects should be classified in one of the defective or non-defective categories based on the discriminate function calculated by the calculation unit; and a display unit configured to display whether the one or more objects are classified in one of the defective or non-defective categories based on the determination of the judging unit;

wherein the rate of overcontrol and the rate of flowout are separated having the normal distribution; and wherein the overcontrol and flowout are judged based on the data of the normal distribution.

38. A computer-implemented quality control method taking the form of pass/fail objects as a pass/fail judgment factor, and used to detect a defective unit in product inspection, comprising:

detecting physical characteristics of an object;

generating object data representing the detected physical characteristics of the object;

computing with a microprocessor a non-defective object probability distribution representing a probability that one or more objects should be classified in a non-defective category based on the generated object data;

computing with the microprocessor a defective object probability distribution representing a probability that one or more objects should be classified in a defective category based on the generated object data;

classifying the one or more objects as being in the non-defective category based on a match between a first pattern of object data and the computed non-defective object probability distribution;

classifying the one or more objects as being in the defective category based on a match between a second pattern of object data and the computed defective object probability distribution;

receiving an rate of flowout in the defective category, which represents a number of objects that are actually in the defective category, and that are judged as being non-defective, the received rate of flowout including a visual observation by an operator of an actual orientation of one component of the object relative to another component of the object;

receiving a rate of overcontrol in the non-defective category, which represents a number of objects that are actually in the non-defective category, and that are actually in the defective category, the received rate of overcontrol including a visual observation by an operator of an actual orientation of one component of the object relative to another component of the object;

calculating a discriminate function to discriminate between one or more objects classified in the non-defective category from one or more objects classified in the defective category based on at least one of the received rate of flowout and the received rate of overcontrol and based on the computed non-defective and defective object probability distributions, the discriminate function being different from a midpoint between a mean value of the computed non-defective object probability distribution and a mean value of the computed defective object probability distribution wherein frequency distributions of the non-defective category and the defective category has a shape of a normal distribution;

determining whether one or more objects should be classified in one of the defective or non-defective categories based on the calculated discriminate function; and displaying an image that illustrates whether the one or more objects are classified in one of the defective or non-defective categories based on the determining step;

wherein the rate of overcontrol and the rate of flowout are separated having normal distribution; and wherein the overcontrol and flowout are judged based on the data of normal distribution. --